US012542092B2

(12) United States Patent
Feng et al.

(10) Patent No.: US 12,542,092 B2
(45) Date of Patent: Feb. 3, 2026

(54) SCAN CIRCUIT, DISPLAY APPARATUS, AND METHOD OF OPERATING SCAN CIRCUIT

(71) Applicants: Hefei BOE Joint Technology Co., Ltd., Anhui (CN); BOE Technology Group Co., Ltd., Beijing (CN)

(72) Inventors: Xuehuan Feng, Beijing (CN); Yu Ai, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 7 days.

(21) Appl. No.: 18/567,127

(22) PCT Filed: Nov. 24, 2022

(86) PCT No.: PCT/CN2022/133945

§ 371 (c)(1),
(2) Date: Dec. 5, 2023

(87) PCT Pub. No.: WO2024/108474

PCT Pub. Date: May 30, 2024

(65) Prior Publication Data

US 2025/0087136 A1 Mar. 13, 2025

(51) Int. Cl.
*G09G 3/32* (2016.01)
*G09G 3/3266* (2016.01)

(52) U.S. Cl.
CPC ............ *G09G 3/32* (2013.01); *G09G 3/3266* (2013.01); *G09G 2310/0286* (2013.01); *G09G 2310/08* (2013.01)

(58) Field of Classification Search
CPC .................. G09G 3/32; G09G 3/3266; G09G 2310/0286; G09G 2310/08
See application file for complete search history.

(56) References Cited

U.S. PATENT DOCUMENTS

2003/0154433 A1 8/2003 Wang et al.
2009/0184914 A1 7/2009 Han et al.
(Continued)

FOREIGN PATENT DOCUMENTS

CN 109920465 A 6/2019
CN 110428772 A 11/2019
(Continued)

OTHER PUBLICATIONS

International Search Report & Written Opinion mailed Jun. 21, 2023, regarding PCT/CN2022/133945.
(Continued)

*Primary Examiner* — Kenneth Bukowski
(74) *Attorney, Agent, or Firm* — Intellectual Valley Law, P.C.

(57) ABSTRACT

A scan circuit is provided. The scan circuit includes a random addressing circuit and a plurality of scan units. The random addressing circuit is configured to receive 2k number of control signals, and is configured to select at least one scan unit for outputting signals based on the 2k number of control signals. The plurality of scan units includes a plurality of scan unit groups. A respective scan unit group of the plurality of scan unit groups includes m number of scan units, and is configured to receive n number of clock signals. A respective scan unit of the m number of scan units in the respective scan unit group is configured to receive n' number of clock signals, n'<n, n' and n being positive integers. At least two scan units of the m number of scan units are configured to receive different combinations of clock signals.

19 Claims, 13 Drawing Sheets

(56) References Cited

U.S. PATENT DOCUMENTS

| | | | | |
|---|---|---|---|---|
| 2010/0128019 | A1* | 5/2010 | Harada | G09G 3/3611 345/212 |
| 2014/0035889 | A1* | 2/2014 | Huang | G09G 3/3674 345/204 |
| 2015/0089333 | A1* | 3/2015 | Hosp | H03M 13/19 714/807 |
| 2020/0126487 | A1* | 4/2020 | Shang | G09G 3/3674 |
| 2020/0273396 | A1* | 8/2020 | Lu | G09G 3/20 |
| 2020/0302886 | A1* | 9/2020 | Kasuo | G09G 3/3648 |
| 2020/0372965 | A1 | 11/2020 | Yuan et al. | |
| 2021/0065603 | A1 | 3/2021 | Feng et al. | |
| 2022/0101648 | A1 | 3/2022 | Blanchon et al. | |
| 2022/0101796 | A1 | 3/2022 | Feng et al. | |

FOREIGN PATENT DOCUMENTS

| | | | |
|---|---|---|---|
| CN | 111179808 | A | 5/2020 |
| CN | 113593482 | A | 11/2021 |
| CN | 114093322 | A | 2/2022 |
| JP | 2002157067 | A | 5/2002 |
| WO | 2008088532 | A2 | 7/2008 |
| WO | 2021164743 | A1 | 8/2021 |

OTHER PUBLICATIONS

Extended European Search Report in the European Patent Application No. 22966169.9, dated Feb. 11, 2025.

* cited by examiner

SCAN CIRCUIT, DISPLAY APPARATUS, AND METHOD OF OPERATING SCAN CIRCUIT

CROSS-REFERENCE TO RELATED APPLICATION

This application is a national stage application under 35 U.S.C. § 371 of International Application No. PCT/CN2022/133945, filed Nov. 24, 2022, the contents of which are incorporated by reference in the entirety.

TECHNICAL FIELD

The present invention relates to display technology, more particularly, to a scan circuit, a display apparatus, and a method of operating a scan circuit.

BACKGROUND

Image display apparatuses include a driver for controlling image display in each of a plurality of pixels. The driver is a transistor-based circuit including a gate driving circuit and a data driving circuit. The gate driving circuit is formed by cascading multiple units of shift register units. Each shift register unit outputs a gate driving signal to one of a plurality of gate lines. The gate driving signals from the gate driving circuit scan through gate lines row by row, controlling each row of transistors to be in on/off states. The gate drive circuit can be integrated into a gate-on-array (GOA) circuit, which can be formed directly in the array substrate of the display panel.

SUMMARY

In one aspect, the present disclosure provides a scan circuit, comprises a random addressing circuit and a plurality of scan units, the random addressing circuit being connected to the plurality of scan units; wherein the random addressing circuit is configured to receive 2k number of control signals, and is configured to select at least one scan unit for outputting signals based on the 2k number of control signals; wherein the plurality of scan units comprises a plurality of scan unit groups; a respective scan unit group of the plurality of scan unit groups comprises m number of scan units, and is configured to receive n number of clock signals; a respective scan unit of the m number of scan units in the respective scan unit group is configured to receive n' number of clock signals, $n'<n$, n' and n being positive integers; and at least two scan units of the m number of scan units in the respective scan unit group are configured to receive different combinations of clock signals.

Optionally, the $2^k$ number of control signals have $2^k$ number of different combinations; the respective scan unit group is selected by the random addressing circuit based on at least one of the $2^k$ number of different combinations; and upon being selected by the random addressing circuit, the m number of scan units in the respective scan unit group are configured to output signals based on the different combinations of clock signals received, respectively.

Optionally, the random addressing circuit comprises a decoder configured to receive the 2k number of control signals, k being a positive integer, k>1; and the decoder comprises k groups of transistors, a respective group of the k groups of transistors being configured to receive respective two control signals of the 2k number of control signals.

Optionally, the n number of clock signals are sequentially shifted by one pulse; the respective scan unit is configured to receive an x-th clock signal, a y-th clock signal, and a z-th clock signal; the x-th clock signal, the y-th clock signal, and the z-th clock signal are three different clock signals selected from the n number of clock signals; the z-th clock signal is shifted by one pulse relative to the y-th clock signal; and the y-th clock signal is shifted by two pulses relative to the x-th clock signal.

Optionally, the respective scan unit comprises a first processing sub-circuit, a second processing sub-circuit, a third processing sub-circuit, a fourth processing sub-circuit, a fifth processing sub-circuit, and an output sub-circuit; the random addressing circuit is coupled to a first node; the first processing sub-circuit is configured to receive a y-th clock signal, and is connected to a second node and connected to a third node; the second processing sub-circuit is configured to receive an x-th clock signal and configured to receive a second voltage supply signal, and is connected to the first node and connected to the third node; the third processing sub-circuit is configured to receive the second voltage supply signal, and is connected to the first node and connected to the second node; the fourth processing sub-circuit is configured to receive the x-th clock signal and configured to receive the second voltage supply signal, and is connected to the first node; the fifth processing sub-circuit is configured to receive the second voltage supply signal, and is connected to the first node and connected to the second node; and the output sub-circuit is configured to receive a z-th clock signal, configured to output an output signal, and is connected to the second node and connected to an output terminal.

Optionally, the random addressing circuit further comprises a first transistor; a gate electrode of the first transistor is configured to receive a y-th clock signal; a first electrode of the first transistor is connected to second electrodes of k groups of transistors in a decoder; and a second electrode of the first transistor is connected to a first node.

Optionally, the random addressing circuit further comprises a first transistor, a thirteenth transistor, and a fourteenth transistor; a gate electrode of the first transistor is configured to receive a y-th clock signal, a first electrode of the first transistor is connected to second electrodes of k groups of transistors in a decoder, a second electrode of the first transistor is connected to first electrodes of the thirteenth transistor and the fourteenth transistor; a gate electrode of the thirteenth transistor is configured to receive a first control signal, the first electrode of the thirteenth transistor is connected to the second electrode of the first transistor, and a second electrode of the thirteenth transistor is connected to a first node; and a gate electrode of the fourteenth transistor is configured to receive a second control signal, the first electrode of the fourteenth transistor is connected to the second electrode of the first transistor, and a second electrode of the fourteenth transistor is connected to a fourth node.

Optionally, the random addressing circuit further comprises a first transistor; a gate electrode of the first transistor are configured to receive a y-th clock signal; a first electrode of the first transistor is configured to receive a first voltage supply signal or the y-th clock signal; and a second electrode of the first transistor is connected to first electrodes of k groups of transistors in a decoder.

Optionally, the random addressing circuit further comprises a first transistor, a thirteenth transistor, and a fourteenth transistor; a gate electrode of the first transistor is configured to receive a y-th clock signal, a first electrode of the first transistor is configured to receive a first voltage supply signal or the y-th clock signal, a second electrode of the first transistor is connected to first electrodes of k groups of transistors in a decoder; a gate electrode of the thirteenth transistor is configured to receive a first control signal, a first electrode of the thirteenth transistor is connected to second electrodes of the k groups of transistors, and a second electrode of the thirteenth transistor is connected to a first node; and a gate electrode of the fourteenth transistor is configured to receive a second control signal, a first electrode of the fourteenth transistor is connected to the second electrodes of the k groups of transistors, and a second electrode of the fourteenth transistor is connected to a fourth node.

Optionally, the random addressing circuit further comprises a first transistor, a thirteenth transistor, and a fourteenth transistor; a gate electrode of the first transistor is configured to receive a y-th clock signal, a first electrode of the first transistor is configured to receive a first voltage supply signal or the y-th clock signal, a second electrode of the first transistor is connected to a first electrode of the thirteenth transistor; a gate electrode of the thirteenth transistor is configured to receive a first control signal, the first electrode of the thirteenth transistor is connected to the second electrode of the first transistor, a second electrode of the thirteenth transistor is connected to first electrodes of k groups of transistors in a decoder; and a gate electrode of the fourteenth transistor is configured to receive a second control signal, a first electrode of the fourteenth transistor is connected to second electrodes of the k groups of transistors, and a second electrode of the fourteenth transistor is connected to a fourth node.

Optionally, the first processing sub-circuit comprises a seventh transistor and an eighth transistor; a gate electrode and a first electrode of the seventh transistor are configured to receive the y-th clock signal, a second electrode of the seventh transistor is connected to a first electrode of the eighth transistor; and a gate electrode of the eighth transistor is connected to the third node, the first electrode of the eighth transistor is connected to the second electrode of the seventh transistor, and a second electrode of the eighth transistor is connected to the second node.

Optionally, the second processing sub-circuit comprises a fourth transistor, a fifth transistor, a sixth transistor; a gate electrode and a first electrode of the fourth transistor are configured to receive the x-th clock signal, a second electrode of the fourth transistor is connected to the third node; a gate electrode of the fifth transistor is connected to the first node, a first electrode of the fifth transistor is configured to receive the second voltage supply signal, and a second electrode of the fifth transistor is connected to the third node; and a gate electrode of the sixth transistor is configured to receive the z-th clock signal, a first electrode of the sixth transistor is configured to receive the second voltage supply signal, and a second electrode of the sixth transistor is connected to the third node.

Optionally, the second processing sub-circuit further comprises a second capacitor; a first capacitor electrode of the second capacitor is connected to the third node; and a second capacitor electrode of the second capacitor is configured to receive the second voltage supply signal.

Optionally, the second processing sub-circuit further comprises a seventeenth transistor; a gate electrode of the seventeenth transistor is connected to a fourth node; a first electrode of the seventeenth transistor is configured to receive the second voltage supply signal; and a second electrode of the seventeenth transistor is connected to the third node.

Optionally, the third processing sub-circuit comprises a ninth transistor and an eleventh transistor; a gate electrode of the ninth transistor is connected to the first node, a first electrode of the ninth transistor is configured to receive the second voltage supply signal, and a second electrode of the ninth transistor is connected to the second node; and a gate electrode of the eleventh transistor is connected to the first node, a first electrode of the eleventh transistor is configured to receive the second voltage supply signal, and a second electrode of the eleventh transistor is connected to the output terminal.

Optionally, the third processing sub-circuit further comprises an eighteenth transistor and a nineteenth transistor; a gate electrode of the eighteenth transistor is connected to a fourth node, a first electrode of the eighteenth transistor is configured to receive the second voltage supply signal, and a second electrode of the eighteenth transistor is connected to the second node; and a gate electrode of the nineteenth transistor is connected to the fourth node, a first electrode of the nineteenth transistor is configured to receive the second voltage supply signal, and a second electrode of the nineteenth transistor is connected to the output terminal.

Optionally, the fourth processing sub-circuit comprises a second transistor; a gate electrode of the second transistor is configured to receive the x-th clock signal; a first electrode of the second transistor is configured to receive the second voltage supply signal; and a second electrode of the second transistor is connected to the first node.

Optionally, the fourth processing sub-circuit further comprises a fifteenth transistor; a gate electrode of the fifteenth transistor is configured to receive the x-th clock signal; a first electrode of the fifteenth transistor is configured to receive the second voltage supply signal; and a second electrode of the fifteenth transistor is connected to a fourth node.

Optionally, the fifth processing sub-circuit comprises a third transistor; a gate electrode of the third transistor is connected to the second node; a first electrode of the third transistor is configured to receive the second voltage supply signal; and a second electrode of the third transistor is connected to the first node.

Optionally, the fifth processing sub-circuit further comprises a first capacitor; a first capacitor electrode of the first capacitor is connected to the first node; and a second capacitor electrode of the first capacitor is configured to receive the second voltage supply signal.

Optionally, the fifth processing sub-circuit further comprises a sixteenth transistor; a gate electrode of the sixteenth transistor is connected to the second node; a first electrode of the sixteenth transistor is configured to receive the second voltage supply signal; and a second electrode of the sixteenth transistor is connected to a fourth node.

Optionally, the respective scan unit further comprises a sixth processing sub-circuit, which is configured to receive the second voltage supply signal, and is connected to the third node and connected to the output terminal of the scan circuit.

Optionally, the sixth processing sub-circuit comprises a twelfth transistor; a gate electrode of the twelfth transistor is connected to the third node; a first electrode of the twelfth transistor is configured to receive the second voltage supply signal; and a second electrode of the twelfth transistor is connected to the output terminal.

Optionally, the output sub-circuit includes a tenth transistor and a third capacitor; a gate electrode of the tenth transistor is connected to the second node, a first electrode of the tenth transistor is configured to receive the z-th clock signal, a second electrode of the tenth transistor is connected to the output terminal; and a first capacitor electrode of the third capacitor is connected to the second node, a second capacitor electrode of the third capacitor is connected to the output terminal.

In another aspect, the present disclosure provides a display apparatus, comprising the scan circuit described herein or fabricated by a method described herein, and a display panel having a plurality of light emitting elements.

In another aspect, the present disclosure provides a method of operating a scan circuit, comprising providing n number of clock signals to a respective scan unit group of a plurality of scan unit groups of the scan circuit; and providing 2k number of control signals to k groups of transistors in a decoder of a random addressing circuit of the scan circuit, a respective group of the k groups of transistors being configured to receive respective two control signals of the 2k number of control signals; wherein providing the n number of clock signals to the respective scan unit group comprises providing n' number of clock signals to a respective scan unit of m number of scan units in the respective scan unit group., n'<n, n' and n being positive integers; and providing different combinations of clock signals to at least two scan units of the m number of scan units in the respective scan unit group.

Optionally, the n number of clock signals are sequentially shifted by one pulse; the method further comprises providing an x-th clock signal, a y-th clock signal, and a z-th clock signal to the respective scan unit; the x-th clock signal, the y-th clock signal, and the z-th clock signal are three different clock signals selected from the n number of clock signals; the z-th clock signal is shifted by one pulse relative to the y-th clock signal; and the y-th clock signal is shifted by two pulses relative to the x-th clock signal.

Optionally, the respective scan unit comprises a first processing sub-circuit, a second processing sub-circuit, a third processing sub-circuit, a fourth processing sub-circuit, a fifth processing sub-circuit, and an output sub-circuit; the method comprises providing a y-th clock signal to the first processing sub-circuit connected to a second node and connected to a third node; providing an x-th clock signal and a second voltage supply signal to the second processing sub-circuit connected to a first node and the third node; providing the second voltage supply signal to the third processing sub-circuit connected to the first node and the second node; providing the x-th clock signal and the second voltage supply signal to the fourth processing sub-circuit connected to the first node; providing the second voltage supply signal to the fifth processing sub-circuit connected to the first node and the second node; and providing a z-th clock signal to the output sub-circuit connected to the second node and the output terminal.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In related display panels, a scan circuit may be made to have metal oxide semiconductor material. When using metal oxide scan circuit, the inventors of the present disclosure discover that it is often necessary to suppress scanning line image defect. In the related display panels, having a sensing period in a frame of image is helpful to suppress the defect. However, a scan circuit having a sensing functionality often involves high complex circuit structures.

Accordingly, the present disclosure provides, inter alia, a scan circuit, a display apparatus, and a method of operating a scan circuit that substantially obviate one or more of the problems due to limitations and disadvantages of the related art. In one aspect, the present disclosure provides a scan circuit. In some embodiments, the scan circuit includes a random addressing circuit and a plurality of scan units, the random addressing circuit being connected to the plurality of scan units. Optionally, the random addressing circuit is configured to receive 2k number of control signals, and is configured to select at least one scan unit for outputting signals based on the 2k number of control signals. Optionally, the plurality of scan units comprises a plurality of scan unit groups. Optionally, a respective scan unit group of the plurality of scan unit groups comprises m number of scan units, and is configured to receive n number of clock signals. Optionally, a respective scan unit of the m number of scan units in the respective scan unit group is configured to receive n' number of clock signals, n'<n, n' and n being positive integers. Optionally, at least two scan units of the m number of scan units in the respective scan unit group are configured to receive different combinations of clock signals.

Figure 1:
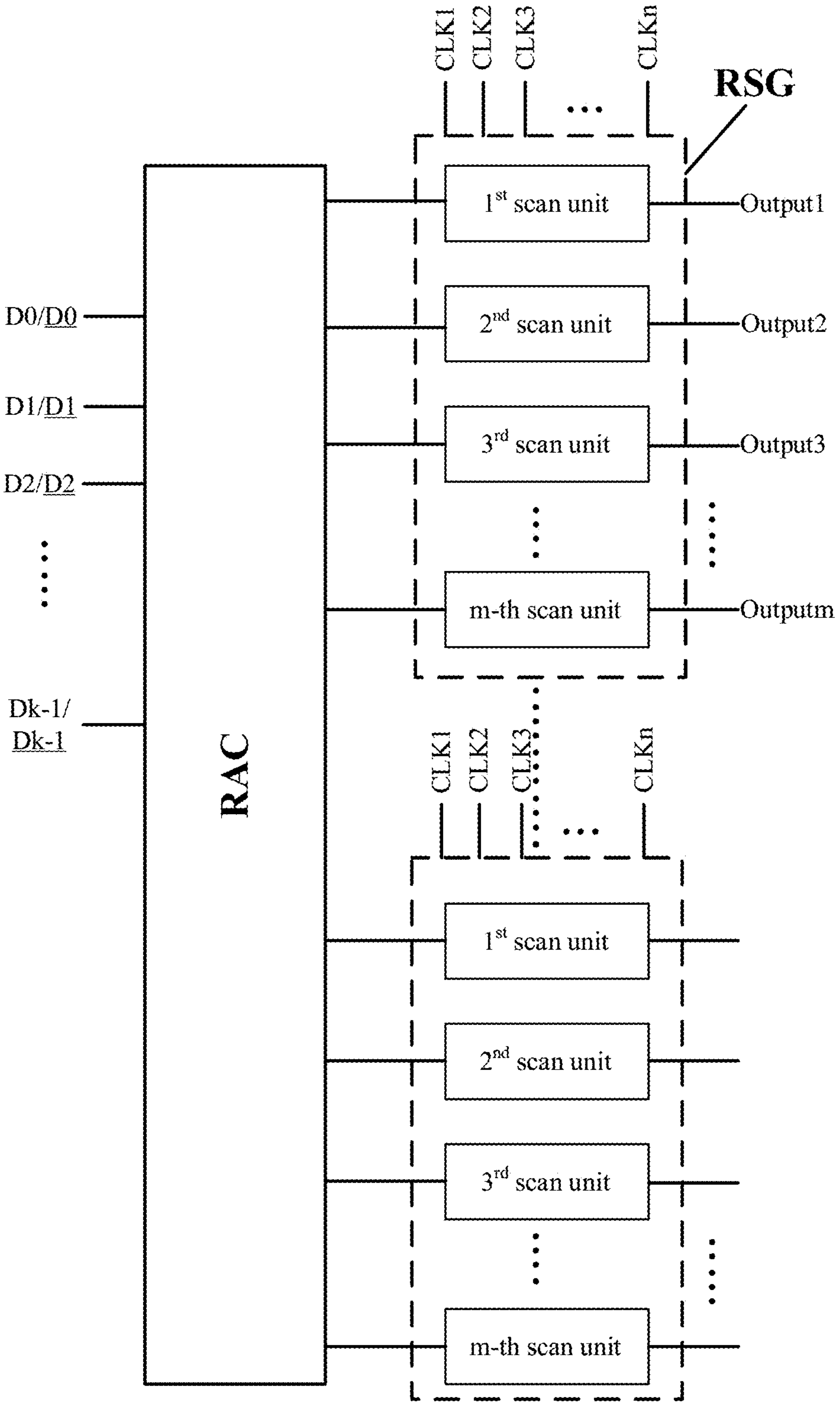
FIG. 1 is a schematic diagram illustrating the structure of a scan circuit in some embodiments according to the present disclosure.

FIG. 1 is a schematic diagram illustrating the structure of a scan circuit in some embodiments according to the present disclosure. Referring to FIG. 1, the scan circuit in some embodiments includes a plurality of stages. A respective stage of the plurality of stages includes a respective scan unit. As shown in FIG. 1, the scan circuit in some embodiments includes a plurality of scan unit groups. A respective scan unit group RSG of the plurality of scan unit groups includes m number of scan units, e.g., a $1^{st}$ scan unit, a $2^{nd}$ scan unit, a $3^{rd}$ scan unit, . . . , a m-th scan unit. Each scan unit is configured to provide control signals (e.g., gate signals, reset control signals, or light emission control signals) to at least one row of subpixels. The control signals output from the respective scan unit group RSG are denoted as Output1, Output2, Output3, . . . , Outputm in FIG. 1. The respective scan unit group RSG is configured to receive n number of clock signals, e.g., CLK1, CLK2, CLK3, . . . , CLKn.

In some embodiments, a respective scan unit in the respective scan unit group RSG is configured to receive n' number of clock signals, n'<n, n' and n being positive integers. At least two scan units of the m number of scan units in the respective scan unit group RSG are configured to receive different combinations of clock signals. Optionally, at least two adjacent scan units of the m number of scan units in the respective scan unit group RSG are configured to receive different combinations of clock signals. Optionally, the m number of scan units in the respective scan unit group RSG are configured to receive different combinations of clock signals. To illustrate, in one example, m=4, n=4, and n'=3. The $1^{st}$ scan unit is configured to receive CLK1, CLK2, and CLK4, the $2^{nd}$ scan unit is configured to receive CLK2, CLK3, and CLK1, the $3^{rd}$ scan unit is configured to receive CLK3, CLK4, and CLK2, and the 4-th scan unit is configured to receive CLK4, CLK1, and CLK3.

In some embodiments, a first scan unit of the m number of scan units in the respective scan unit group RSG are configured to receive a first combination of clock signals, a second scan unit of the m number of scan units in the respective scan unit group RSG are configured to receive a second combination of clock signals. Optionally, the first scan unit and the second scan unit are two adjacent scan units in the respective scan unit group RSG. In some embodiments, the first combination of clock signals includes n' number of clock signals, and the second combination of clock signals includes n' number of clock signals. Optionally, the first combination of clock signals includes at least one clock signal that is not in the second combination of clock signals. Optionally, the second combination of clock signals includes at least one clock signal that is not in the first combination of clock signals. Optionally, n" number of clock signals out of the n' number of clock signals in the first combination of clock signals are the same clock signals as n" number of clock signals out of the n' number of clock signals in the second combination of clock signals, wherein n"<n', and n" is a positive integer. In one example, n"=(n'−1). To illustrate, in one example, m=4, n=4, n'=3, and n"=2. The $1^{st}$ scan unit is configured to receive CLK1, CLK3, and CLK4, the $2^{nd}$ scan unit is configured to receive CLK2, CLK4, and CLK1, the $3^{rd}$ scan unit is configured to receive CLK3, CLK1, and CLK2, and the 4-th scan unit is configured to receive CLK4, CLK2, and CLK3.

In some embodiments, the scan circuit further includes a random addressing circuit RAC. The random addressing circuit RAC is connected to each scan unit in the scan circuit. The random addressing circuit RAC is configured to receive k groups of control signals, e.g., D0/$\overline{D0}$, D1/$\overline{D1}$, D2/$\overline{D2}$, . . . , Dk-1/$\overline{Dk\text{-}1}$. Optionally, a respective group of the k groups of control signals include two control signals (e.g., D0 and $\overline{D0}$), and the random addressing circuit RAC is configured to receive 2k number of control signals. The random addressing circuit RAC is configured to randomly select at least one scan unit for outputting signals.

Figure 2A:
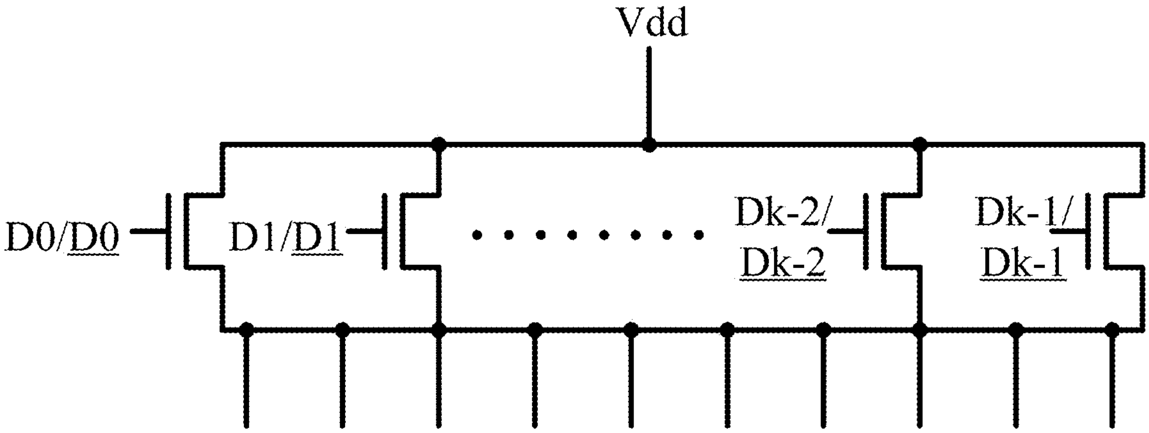
FIG. 2A is a schematic diagram illustrating the structure of a decoder in a random addressing circuit in a scan circuit in some embodiments according to the present disclosure.
Figure 2B:
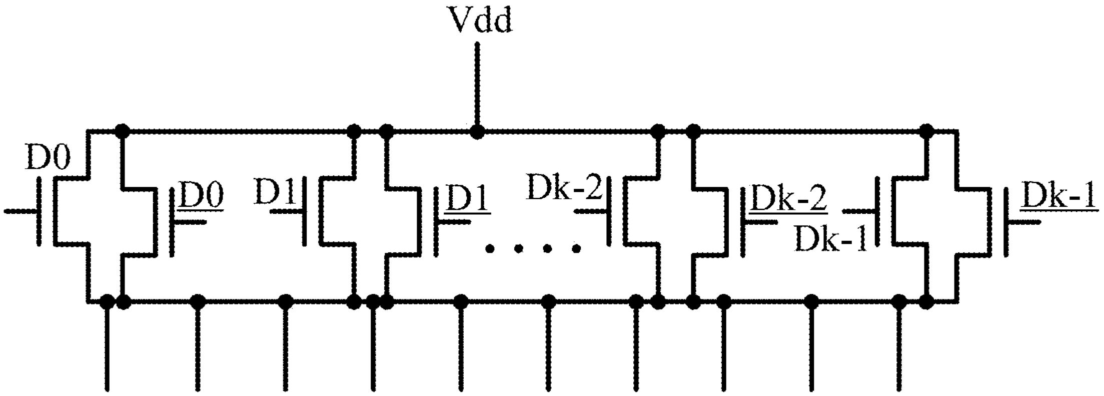
FIG. 2B is a schematic diagram illustrating the structure of a decoder in a random addressing circuit in a scan circuit in some embodiments according to the present disclosure.

In some embodiments, the random addressing circuit RAC includes a decoder configured to receive the 2k number of control signals, e.g., D0/$\overline{D0}$, D1/$\overline{D1}$, D2/$\overline{D2}$, . . . , Dk-2/$\overline{Dk\text{-}2}$, Dk-1/$\overline{Dk\text{-}1}$, k being a positive integer, k>1. FIG. 2A is a schematic diagram illustrating the structure of a decoder in a random addressing circuit in a scan circuit in some embodiments according to the present disclosure. FIG. 2B is a schematic diagram illustrating the structure of a decoder in a random addressing circuit in a scan circuit in some embodiments according to the present disclosure. Referring to FIG. 2A and FIG. 2B, the decoder in some embodiments includes k groups of transistors, a respective group of transistor being configured to receive respective two control signals of the **2*k*** number of control signals. A respective group of the k groups of transistors includes L number of transistors, L is an integer equal to or greater than 1.

In the example depicted in FIG. 2A, L=1; the respective two control signals control on state and off state of the transistor; a first one of the respective two control signals is configured to turn on the transistor, and the second one of the respective two control signals is configured to turn off the transistor.

In the example depicted in FIG. 2B, L=2; the respective two control signals control respective two transistors, respectively; a first one of the respective two control signals is configured to control a first one of the respective two transistors; and the second one of the respective two control signals is configured to control a second one of the respective two transistors. The decoder is configured to receive a first voltage supply signal Vdd (e.g., a high voltage signal), either directly or indirectly.

In some embodiments, the random addressing circuit RAC includes a plurality of decoders. Optionally, a total number of the plurality of decoders is the same as a total number of the plurality of scan unit groups. A respective decoder of the plurality of decoders is connected to each of the m number of scan units in a respective scan unit group RSG of the plurality of scan unit groups.

In some embodiments, a total number of states that can be decoded from the 2k number of control signals is $2^k$. For example, when k=10, the total number of states that can be decoded from the decoder alone is $2^{10}$, i.e., 1024. With regard to the scan circuit, a total number of states that can be decoded is $n\times 2^k$, wherein n is a total number of clock signals input to the respective scan unit group. In one example, n=4, and the total number of states that can be decoded from the scan circuit is $4\times 2^{10}$, i.e., 4096. In a display panel having a 4000×2000 resolution, a total number of rows of subpixels is 2160. Thus, the total number of states that can be decoded is greater than the total number of rows of subpixels or a total number of scan units. The scan circuit is capable of randomly addressing the rows of subpixels in the display panel.

In some embodiments, the 2k number of control signals have $2^k$ number of different combinations. The respective scan unit group is selected by the random addressing circuit based on at least one of the $2^k$ number of different combinations. Upon being selected by the random addressing circuit, the m number of scan units in the respective scan unit group are configured to output signals (e.g., at different time) based on the different combinations of clock signals received, respectively. Optionally, different scan unit groups are selected based on different combinations of the $2^k$ number of different combinations.

Figure 3:
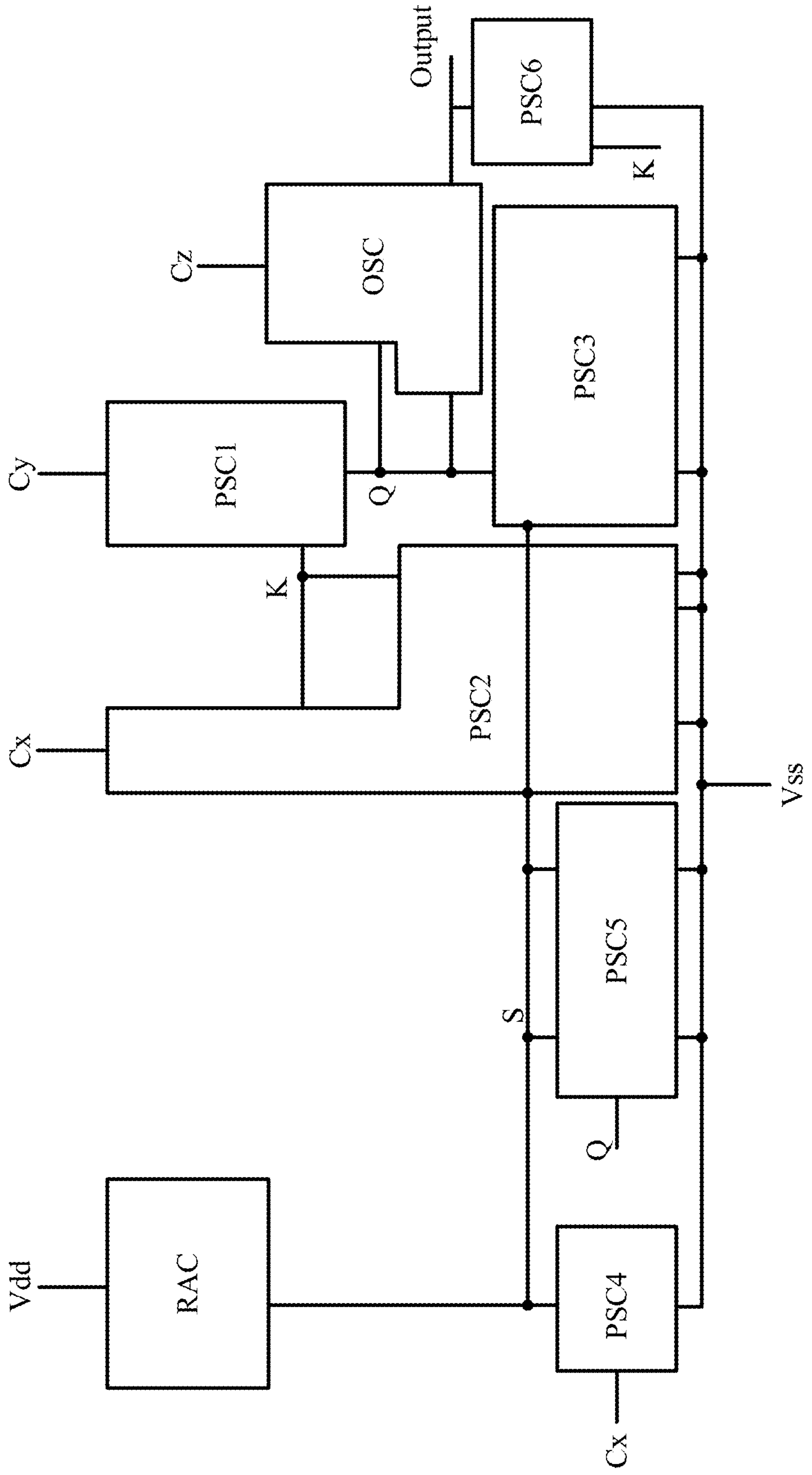
FIG. 3 is a schematic diagram illustrating the structure of a scan circuit in some embodiments according to the present disclosure.

FIG. 3 is a schematic diagram illustrating the structure of a scan circuit in some embodiments according to the present disclosure. Referring to FIG. 3, the scan circuit in some embodiments includes a first node S, a second node Q, and a third node K. In some embodiments, the scan circuit includes a random addressing circuit RAC and a respective scan unit in a respective scan unit group connected to the random addressing circuit RAC. In some embodiments, the respective scan unit in the respective scan unit group includes a first processing sub-circuit PSC1, a second processing sub-circuit PSC2, a third processing sub-circuit PSC3, a fourth processing sub-circuit PSC4, a fifth processing sub-circuit PSC5, and an output sub-circuit OSC. Optionally, the respective scan unit further includes a sixth processing sub-circuit PSC6.

In some embodiments, the respective scan unit group is configured to receive n number of clock signals, and the respective scan unit in the respective scan unit group is configured to receive n' number of clock signals, n'<n, n' and n being positive integers. In the example depicted in FIG. 3, n=4 and n'=3. To illustrate, the respective scan unit in the respective scan unit group is configured to receive an x-th clock signal Cx, a y-th clock signal Cy, and a z-th clock signal Cz. The x-th clock signal Cx, the y-th clock signal Cy, and the z-th clock signal Cz are three different clock signals selected from the n number of clock signals input to the respective scan unit group (e.g., four different clock signals input to the respective scan unit group).

In some embodiments, the n number of clock signals are sequentially shifted by one pulse. Optionally, the z-th clock signal Cz is shifted by one pulse relative to the y-th clock signal Cy. Optionally, the y-th clock signal Cy is shifted by two pulses relative to the x-th clock signal Cx. In one example, the n number of clock signals includes a first clock signal CLK1, a second clock signal CLK2, a third clock signal CLK3, and a fourth clock signal CLK4. The first clock signal CLK1, the second clock signal CLK2, the third clock signal CLK3, and the fourth clock signal CLK4 are sequentially shifted by one pulse. As used herein, the term "shifted by a number of pulse(s)" refers to scenarios in which clock signals are shifted relative to each other by exactly the number of pulse(s) or clock signals are shifted relative to each other by approximately the number of pulse(s). Accordingly, as used herein, the term "shifted by one pulse" refers to shifted by 0.3 number of a pulse to 1.7 number of a pulse, e.g., shifted by 0.3 number of a pulse to 0.4 number of a pulse, 0.4 number of a pulse to 0.5 number of a pulse, 0.5 number of a pulse to 0.6 number of a pulse, 0.6 number of a pulse to 0.7 number of a pulse, 0.7 number of a pulse to 0.8 number of a pulse, 0.8 number of a pulse to 0.9 number of a pulse, 0.9 number of a pulse to 1.0 number of a pulse, 1.0 number of a pulse to 1.1 number of a pulse, 1.1 number of a pulse to 1.2 number of a pulse, 1.2 number of a pulse to 1.3 number of a pulse, 1.3 number of a pulse to 1.4 number of a pulse, 1.4 number of a pulse to 1.5 number of a pulse, 1.5 number of a pulse to 1.6 number of a pulse, or 1.6 number of a pulse to 1.7 number of a pulse. As used herein, the term "shifted by two pulses" refers to shifted by 1.3 number of a pulse to 2.7 number of a pulse, e.g., shifted by 1.3 number of a pulse to 1.4 number of a pulse, 1.4 number of a pulse to 1.5 number of a pulse, 1.5 number of a pulse to 1.6 number of a pulse, 1.6 number of a pulse to 1.7 number of a pulse, 1.7 number of a pulse to 1.8 number of a pulse, 1.8 number of a pulse to 1.9 number of a pulse, 1.9 number of a pulse to 2.0 number of a pulse, 2.0 number of a pulse to 2.1 number of a pulse, 2.1 number of a pulse to 2.2 number of a pulse, 2.2 number of a pulse to 2.3 number of a pulse, 2.3 number of a pulse to 2.4 number of a pulse, 2.4 number of a pulse to 2.5 number of a pulse, 2.5 number of a pulse to 2.6 number of a pulse, or 2.6 number of a pulse to 2.7 number of a pulse.

In one example, the x-th clock signal Cx is the first clock signal CLK1, the y-th clock signal Cy is the third clock signal CLK3, and the z-th clock signal Cz is the fourth clock signal CLK4. The fourth clock signal CLK4 is shifted by one pulse relative to the third clock signal CLK3. The third clock signal CLK3 is shifted by two pulses relative to the first clock signal CLK1.

In another example, the x-th clock signal Cx is the second clock signal CLK2, the y-th clock signal Cy is the fourth clock signal CLK4, and the z-th clock signal Cz is the first clock signal CLK1. The first clock signal CLK1 is shifted by one pulse relative to the fourth clock signal CLK4. The fourth clock signal CLK4 is shifted by two pulses relative to the second clock signal CLK2.

In another example, the x-th clock signal Cx is the third clock signal CLK3, the y-th clock signal Cy is the first clock signal CLK1, and the z-th clock signal Cz is the second clock signal CLK2. The second clock signal CLK2 is shifted by one pulse relative to the first clock signal CLK1. The first clock signal CLK1 is shifted by two pulses relative to the third clock signal CLK3.

In another example, the x-th clock signal Cx is the fourth clock signal CLK4, the y-th clock signal Cy is the second clock signal CLK2, and the z-th clock signal Cz is the third clock signal CLK3. The third clock signal CLK3 is shifted by one pulse relative to the second clock signal CLK2. The second clock signal CLK2 is shifted by two pulses relative to the fourth clock signal CLK4.

In some embodiments, the random addressing circuit RAC is coupled to the first node S.

In some embodiments, the first processing sub-circuit PSC1 is configured to receive the y-th clock signal Cy, and is connected to the second node Q and connected to the third node K.

In some embodiments, the second processing sub-circuit PSC2 is configured to receive the x-th clock signal Cx and configured to receive a second voltage supply signal Vss (e.g., a low voltage signal), and is connected to the first node S and connected to the third node K.

In some embodiments, the third processing sub-circuit PSC3 is configured to receive the second voltage supply signal Vss, and is connected to the first node S and connected to the second node Q. Optionally, the third processing sub-circuit PSC3 is configured to receive a third voltage supply signal Vss3, the third voltage supply signal Vss3 is different from the second voltage supply signal Vss.

In some embodiments, the fourth processing sub-circuit PSC4 is configured to receive the x-th clock signal Cx and configured to receive the second voltage supply signal Vss, and is connected to the first node S.

In some embodiments, the fifth processing sub-circuit PSC5 is configured to receive the second voltage supply signal Vss, and is connected to the first node S and connected to the second node Q. Optionally, the fifth processing sub-circuit PSC5 is configured to receive a fourth voltage supply signal Vss4, the fourth voltage supply signal Vss4 is different from the second voltage supply signal Vss.

In some embodiments, the sixth processing sub-circuit PSC6 is configured to receive the second voltage supply signal Vss, and is connected to the third node K and connected to an output terminal of the scan circuit. Optionally, the sixth processing sub-circuit PSC6 is configured to receive a fifth voltage supply signal Vss5, the fifth voltage supply signal Vss5 is different from the second voltage supply signal Vss.

In some embodiments, the output sub-circuit OSC is configured to receive the z-th clock signal Cz, configured to output an output signal Output, and is connected to the second node Q and connected to the output terminal. Optionally, the output sub-circuit OSC is configured to receive a fixed voltage supply signal VF, configured to output an output signal Output, and is connected to the second node Q and connected to the output terminal. Optionally, the fixed voltage supply signal VF is the first voltage supply signal Vdd or the second voltage supply signal Vss.

Figure 4:
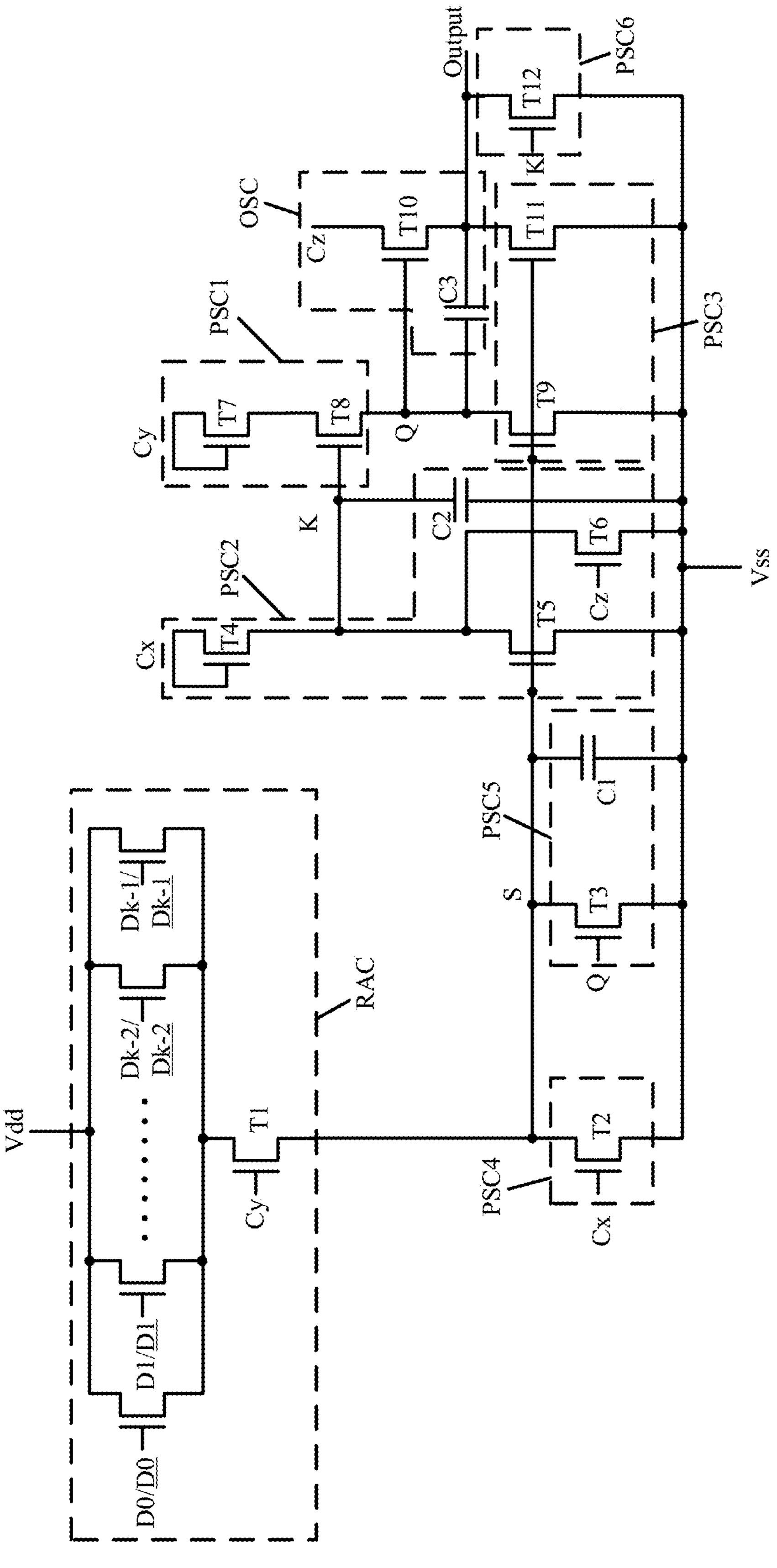
FIG. 4 is a circuit diagram of a scan circuit in some embodiments according to the present disclosure.

FIG. 4 is a circuit diagram of a scan circuit in some embodiments according to the present disclosure. FIG. 4 shows a random addressing circuit RAC and a respective scan unit in a respective scan unit group. Referring to FIG. 4, the random addressing circuit RAC in some embodiments includes a decoder comprising k groups of transistors connected in parallel. First electrodes of the k groups of transistors are configured to receive a first voltage supply signal Vdd. The random addressing circuit RAC in some embodiments further includes a first transistor T1. Second electrodes of the k groups of transistors are connected to a first electrode of the first transistor T1. The k groups of transistors are configured to receive the 2k number of control signals, e.g., D0/$\underline{D0}$, D1/$\underline{D1}$, D2/$\underline{D2}$, . . . , Dk-2/$\underline{Dk\text{-}2}$, Dk-1/$\underline{Dk\text{-}1}$, k being a positive integer. A respective transistor is configured to receive a respective control signal of the 2k number of control signals.

In some embodiments, a gate electrode of the first transistor T1 is configured to receive a clock signal which is the same as the clock signal received by the first processing sub-circuit PSC1 or the second processing sub-circuit PSC2. Optionally, a gate electrode of the first transistor T1 is configured to receive the y-th clock signal Cy, a first electrode of the first transistor T1 is connected to second electrodes of the k groups of transistors in the decoder, a second electrode of the first transistor T1 is connected to the first node S.

In some embodiments, the fourth processing sub-circuit PSC4 includes a second transistor T2. A gate electrode of the second transistor T2 is configured to receive the x-th clock signal Cx, a first electrode of the second transistor T2 is configured to receive a second voltage supply signal Vss, and a second electrode of the second transistor T2 is connected to the first node S and connected to the second electrode of the first transistor T1.

In some embodiments, the fifth processing sub-circuit PSC5 includes a third transistor T3 and a first capacitor C1. A gate electrode of the third transistor T3 is connected to the second node Q, a first electrode of the third transistor T3 is configured to receive the second voltage supply signal Vss, and a second electrode of the third transistor T3 is connected to the first node S. A first capacitor electrode of the first capacitor C1 is connected to the first node S, a second capacitor electrode of the first capacitor C1 is configured to receive a second voltage supply signal Vss.

In some embodiments, the second processing sub-circuit PSC2 includes a fourth transistor T4, a fifth transistor T5, a sixth transistor T6, and a second capacitor C2. A gate electrode and a first electrode of the fourth transistor T4 are configured to receive the x-th clock signal Cx, a second electrode of the fourth transistor T4 is connected to the third node K. A gate electrode of the fifth transistor T5 is connected to the first node S, a first electrode of the fifth transistor T5 is configured to receive the second voltage supply signal Vss, and a second electrode of the fifth transistor T5 is connected to the third node K. A gate electrode of the sixth transistor T6 is configured to receive the z-th clock signal Cz, a first electrode of the sixth transistor T6 is configured to receive the second voltage supply signal Vss, and a second electrode of the sixth transistor T6 is connected to the third node K. A first capacitor electrode of the second capacitor C2 is connected to the third node K, a second capacitor electrode of the second capacitor C2 is configured to receive the second voltage supply signal Vss.

In some embodiments, the first processing sub-circuit PSC1 includes a seventh transistor T7 and an eighth transistor T8. A gate electrode and a first electrode of the seventh transistor T7 are configured to receive the y-th clock signal Cy, a second electrode of the seventh transistor T7 is connected to a first electrode of the eighth transistor T8. A gate electrode of the eighth transistor T8 is connected to the third node K, a first electrode of the eighth transistor T8 is connected to the second electrode of the seventh transistor T7, and a second electrode of the eighth transistor T8 is connected to the second node Q.

In some embodiments, the third processing sub-circuit PSC3 includes a ninth transistor T9 and an eleventh transistor T11. A gate electrode of the ninth transistor T9 is connected to the first node S, a first electrode of the ninth transistor T9 is configured to receive the second voltage supply signal Vss, and a second electrode of the ninth transistor T9 is connected to the second node Q. A gate electrode of the eleventh transistor T11 is connected to the first node S, a first electrode of the eleventh transistor T11 is configured to receive the second voltage supply signal Vss, and a second electrode of the eleventh transistor T11 is connected to an output terminal.

In some embodiments, the sixth processing sub-circuit PSC6 includes a twelfth transistor T12. A gate electrode of the twelfth transistor T12 is connected to the third node K, a first electrode of the twelfth transistor T12 is configured to receive the second voltage supply signal Vss, and a second electrode of the twelfth transistor T12 is connected to the output terminal.

In some embodiments, the output sub-circuit OSC includes a tenth transistor T10 and a third capacitor C3. A gate electrode of the tenth transistor T10 is connected to the second node Q, a first electrode of the tenth transistor T10 is configured to receive the z-th clock signal Cz, a second electrode of the tenth transistor T10 is connected to the output terminal. A first capacitor electrode of the third capacitor C3 is connected to the second node Q, a second capacitor electrode of the third capacitor C3 is connected to the output terminal.

Figure 5:
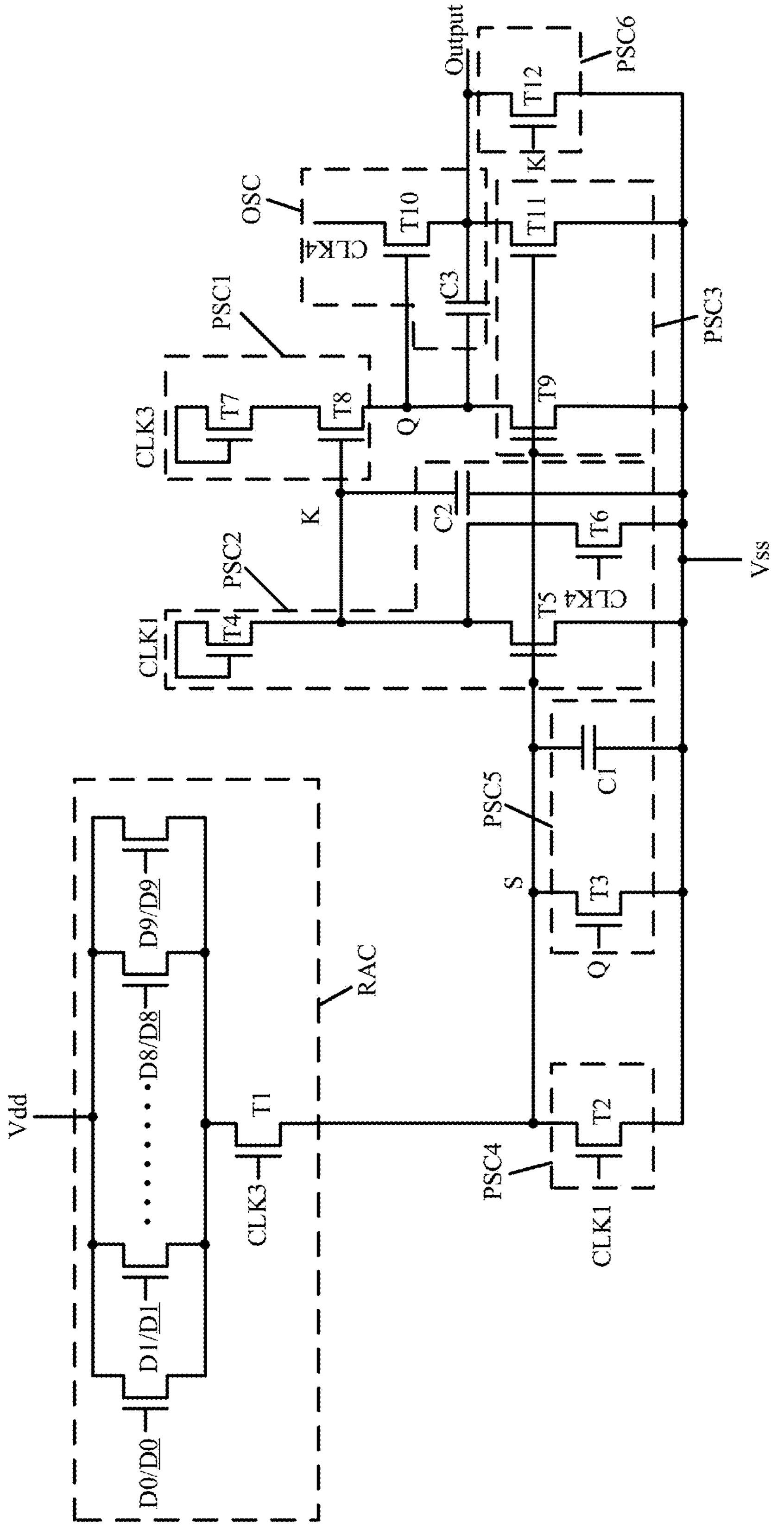
FIG. 5 is a circuit diagram of a scan circuit in some embodiments according to the present disclosure.

FIG. 5 is a circuit diagram of a scan circuit in some embodiments according to the present disclosure. Referring to FIG. 5, in one example, k=10, n=4. For example, the k groups of transistors in the decoder includes ten transistors connected in parallel. The n number of clock signals includes a first clock signal CLK1, a second clock signal CLK2, a third clock signal CLK3, and a fourth clock signal CLK4. The respective scan unit depicted in FIG. 5 is configured to receive the first clock signal CLK1, the third clock signal CLK3, and the fourth clock signal CLK4.

Figure 6:
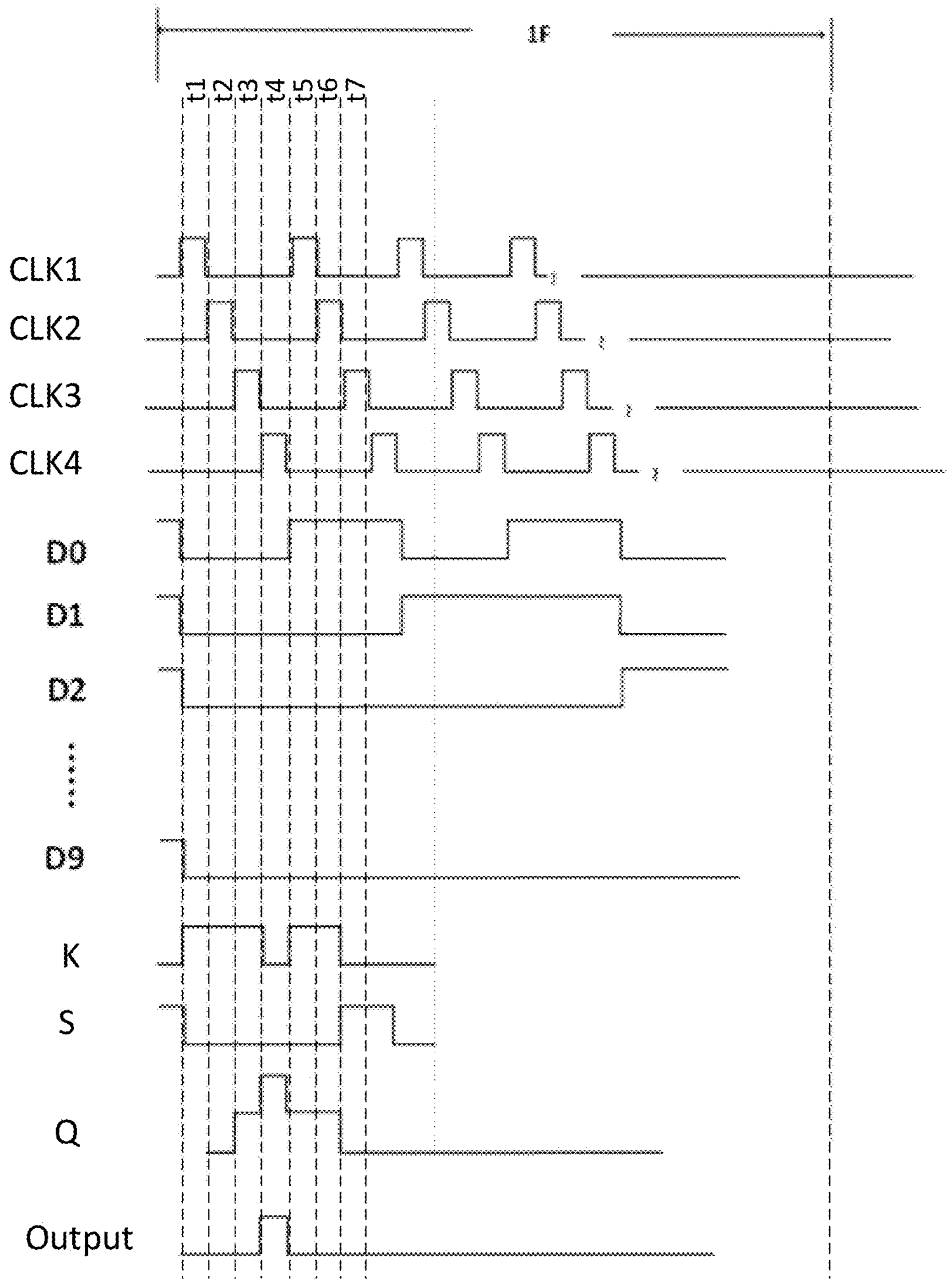
FIG. 6 is a timing diagram illustrating an operation of the scan circuit in some embodiments according to the present disclosure.

FIG. 6 is a timing diagram illustrating an operation of the scan circuit in some embodiments according to the present disclosure. FIG. 6 shows a time diagram in one frame of image 1F. Referring to FIG. 6, the method of operating the scan circuit includes providing n number of clock signals (e.g., the first clock signal CLK1, the second clock signal CLK2, the third clock signal CLK3, and the fourth clock signal CLK4) to the scan circuit; and providing k groups of control signals (e.g., 2*k* number of control signals: D0/$\underline{D0}$, D1/$\underline{D1}$, D2/$\underline{D2}$, . . . , D9/$\underline{D9}$) to a random addressing circuit RAC. As shown in FIG. 6, the first clock signal CLK1, the second clock signal CLK2, the third clock signal CLK3, and the fourth clock signal CLK4 are sequentially shifted by one pulse.

In some embodiments, the method of operating the scan circuit includes providing n' number of clock signals (e.g., the first clock signal CLK1, the third clock signal CLK3, and the fourth clock signal CLK4) to a respective scan unit of a respective scan unit group of the scan circuit. Optionally, $n'<n$, n' and n being positive integers. In one example, $n=n'+1$. The fourth clock signal CLK4 is shifted by one pulse relative to the third clock signal CLK3. The third clock signal CLK3 is shifted by two pulses relative to the first clock signal CLK1.

Referring to FIG. 6, a combination of the 2k number of control signals is provided to a respective decoder, including D0/$\underline{D0}$, D1/$\underline{D1}$, D2/$\underline{D2}$, . . . , D9/$\underline{D9}$. In FIG. 6, D0 to D9 are shown. $\underline{D0}$ to $\underline{D9}$ are inverted signals with respect to D0 to D9. In one example, a particular combination of the 2k number of control signals corresponds to a particular scan unit group of the plurality of scan unit groups. For example, the combination of D0/$\underline{D0}$, D1/$\underline{D1}$, D2/$\underline{D2}$, . . . , D9/$\underline{D9}$ depicted in FIG. 6 corresponds to a m1-th scan unit group of the plurality of scan unit groups. Referring to FIG. 4 and FIG. 5, the particular combination of D0/$\underline{D0}$, D1/$\underline{D1}$, D2/$\underline{D2}$, . . . , D9/$\underline{D9}$ depicted in FIG. 6 is configured to allow the first voltage supply signal Vdd to pass through the respective decoder to the fourth processing sub-circuit PSC4. Each scan unit group of the plurality of scan unit groups corresponds to a unique combination of the 2k number of control signals. Thus, the unique combination of the 2k number of control signals only allows the first voltage supply signal Vdd to pass through the respective decoder but not the other decoders in the scan circuit. Thus, the combination of the 2k number of control signals is used for selecting a scan unit group out of the plurality of scan unit groups.

Once the scan unit group is selected out of the plurality of scan unit groups (a first level selection), the m number of scan units of the selected scan unit group can be further selected to output control signals based on the different combination of clock signals provided to the m number of scan units in the selected scan unit group (a second level selection). For example, a first scan unit in the selected scan unit group is selected when the first clock signal CLK1 is provided to the first scan unit as the x-th clock signal Cx, the third clock signal CLK3 is provided to the first scan unit as the y-th clock signal Cy, and the fourth clock signal CLK4 is provided to the first scan unit as the z-th clock signal Cz. In another example, a second scan unit in the selected scan unit group is selected when the second clock signal CLK2 is provided to the second scan unit as the x-th clock signal Cx, the fourth clock signal CLK4 is provided to the second scan unit as the y-th clock signal Cy, and the first clock signal CLK1 is provided to the second scan unit as the z-th clock signal Cz. In another example, a third scan unit in the selected scan unit group is selected when the third clock signal CLK3 is provided to the third scan unit as the x-th clock signal Cx, the first clock signal CLK1 is provided to the third scan unit as the y-th clock signal Cy, and the second clock signal CLK2 is provided to the third scan unit as the z-th clock signal Cz. In another example, a fourth scan unit in the selected scan unit group is selected when the fourth clock signal CLK4 is provided to the fourth scan unit as the x-th clock signal Cx, the second clock signal CLK2 is provided to the fourth scan unit as the y-th clock signal Cy, and the third clock signal CLK3 is provided to the fourth scan unit as the z-th clock signal Cz.

Different combinations of the 2k number of control signals may be generated in a sequence that does not correspond to the plurality of scan unit groups sequentially group-by-group. In some embodiments, the different combinations of the 2k number of control signals may be generated in a sequence corresponding to the plurality of scan unit groups in a random or pseudo random sequence. For example, time sequentially, a first combination of the 2k number of control signals corresponds to a 20-th scan unit group, a second combination of the 2k number of control signals corresponds to a $3^{rd}$ scan unit group, a third combination of the 2k number of control signals corresponds to a 100-th scan unit group, and so on.

In some embodiments, the frame of image includes a first phase t1, a second phase t2, a third phase t3, a fourth phase t4, a fifth phase t5, a sixth phase t6, and a seventh phase t7. In the first phase t1, the respective scan unit selected by the random addressing circuit is configured to receive a high voltage of the first clock signal CLK1. The fourth transistor T4 is turned on by the high voltage of the first clock signal CLK1, and the third node K is at a high voltage level. The second transistor T2 is turned on by the high voltage of the first clock signal CLK1, and the first node S is at a low voltage level. The output terminal is configured to output an output signal Output at a low voltage level (e.g., an ineffective voltage).

In the second phase t2, the second clock signal CLK2 is at a high voltage level. The respective scan unit selected by the random addressing circuit is not configured to receive the second clock signal CLK2. Due to the presence of the second capacitor C2, the voltage level at the third node K remains at a high voltage level. The first node S is at a low voltage level. The output terminal is configured to output an output signal Output at a low voltage level.

In the third phase t3, the third clock signal CLK3 is at a high voltage level. The seventh transistor T7 is turned on by the high voltage of the third clock signal CLK3. The voltage level at the third node K remains at a high voltage level. The eight transistor T8 is turned on by the high voltage level at the third node K. The second node Q is at a high voltage level in the third phase t3. The tenth transistor T10 is turned on by the high voltage level at the second node Q. Because the fourth clock signal CLK4 is at a low voltage level in the third phase t3, the output terminal is configured to output an output signal Output at a low voltage level (e.g., an ineffective voltage).

In the third phase t3, the second node Q is at a high voltage level, turning on the third transistor T3. The second voltage supply signal Vss passes through the third transistor T3. The first node S is at a low voltage level in the third phase t3.

In the fourth phase t4, the fourth clock signal CLK4 is at a high voltage level. The sixth transistor T6 is turned on by the high voltage level of the fourth clock signal CLK4. The second voltage supply signal Vss passes through the sixth transistor T6. The third node K is at a low voltage level. The first node S remains at a low voltage level in the fourth phase t4. The second node Q remains at a high voltage level, turning on the tenth transistor T10. The fourth clock signal CLK4 passes through the tenth transistor T10. The output terminal is configured to output an output signal Output at a high voltage level (e.g., an effective voltage).

In the fifth phase t5, the first clock signal CLK1 is at a high voltage level turning on the fourth transistor T4, and the fourth clock signal CLK4 is at a low voltage level. The first clock signal CLK1 passes through the fourth transistor T4. The third node K is at a high voltage level in the fifth phase t5. The high voltage level at the third node K turns on the twelfth transistor T12, the second voltage supply signal Vss passes through the twelfth transistor T12. The second node Q remains at a high voltage level, turning on the tenth transistor T10. The fourth clock signal CLK4 passes through the tenth transistor T10. The fourth clock signal CLK4 is at a low voltage level. The output terminal is configured to output an output signal Output at a low voltage level (e.g., an ineffective voltage).

In the sixth phase t6, the second clock signal CLK2 is at a high voltage level. The respective scan unit selected by the random addressing circuit is not configured to receive the second clock signal CLK2. The second node Q remains at a high voltage level. The output terminal is configured to output an output signal Output at a low voltage level.

In the seventh phase t7, the third clock signal CLK3 is at a high voltage level. The high voltage level of the third clock signal CLK3 turns on the first transistor T1. The first voltage supply signal passes through the first transistor T1. The first node S is at a high voltage level. The seventh transistor T7 is turned on by the high voltage of the third clock signal CLK3. The voltage level at the third node K remains at a high voltage level. The eight transistor T8 is turned on by the high voltage level at the third node K. The second node Q is at a high voltage level in the seventh phase t7. The tenth transistor T10 is turned on by the high voltage level at the second node Q. Because the fourth clock signal CLK4 is at a low voltage level in the seventh phase t7, the output terminal is configured to output an output signal Output at a low voltage level (e.g., an ineffective voltage).

The present disclosure may be implemented with various appropriate scan circuits. In one example, the scan circuit is a light emitting control signal generating circuit configured to generate light emitting control signals for subpixels in a display substrate. In another example, the scan circuit is a gate scanning signal generating circuit configured to generate gate scanning signals for subpixels in a display substrate. In another example, the scan circuit is a reset control signal generating circuit configured to generate reset control signals for subpixels in a display substrate.

Various appropriate scan units may be implemented in the present disclosure. The inventors of the present disclosure discover that gate electrodes of the fifth transistor T5, the ninth transistor T9, and the eleventh transistor T11 are prone to stress defects because the gate electrodes of the fifth transistor T5, the ninth transistor T9, and the eleventh transistor T11 are subject to the high voltage level at the first node S for a prolong period of time during the operation of the scan circuit. The inventors of the present disclosure discover another scan circuit having a unique structure that obviates the stress issue.

Figure 7:
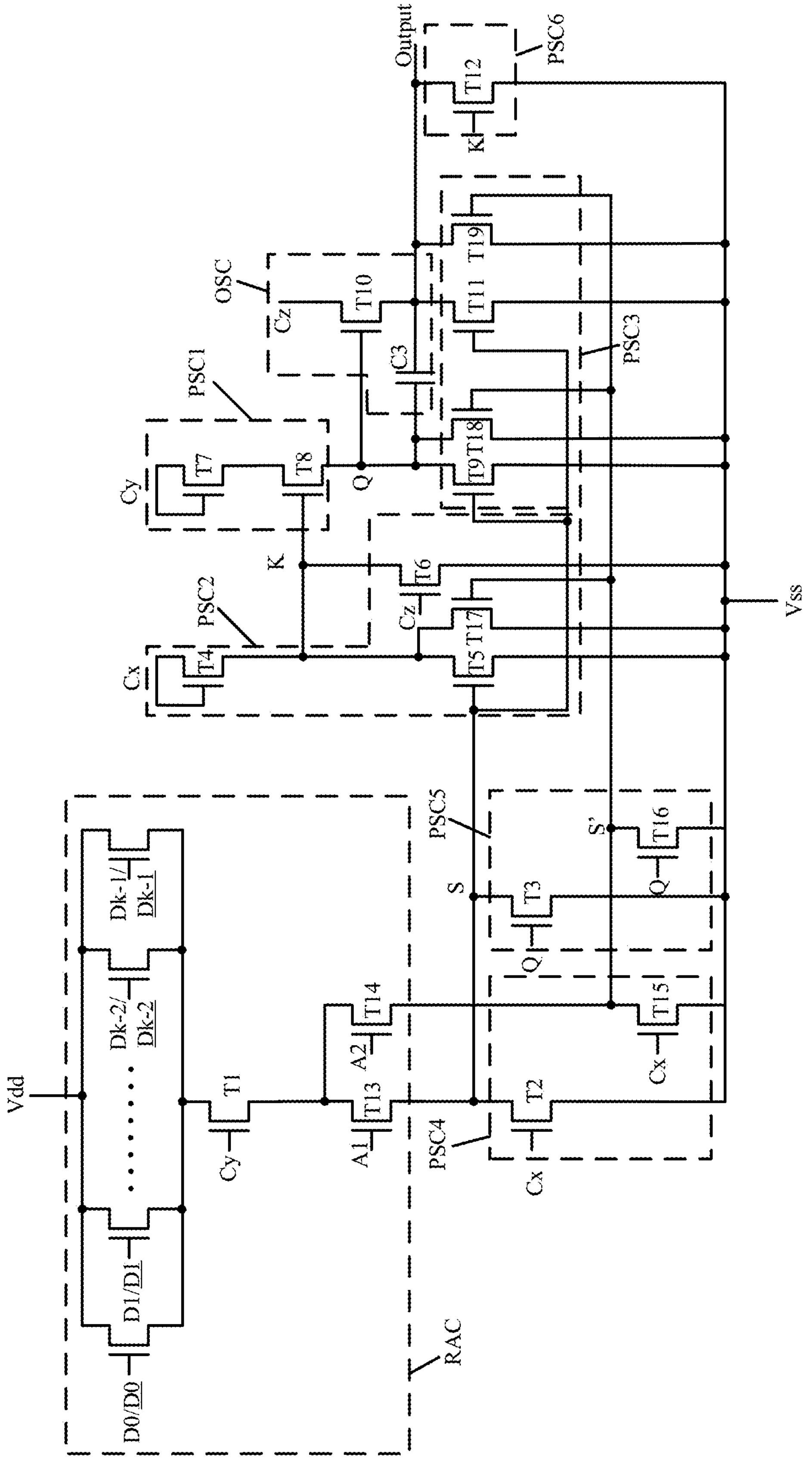
FIG. 7 is a circuit diagram of a scan circuit in some embodiments according to the present disclosure.

FIG. 7 is a circuit diagram of a scan circuit in some embodiments according to the present disclosure. FIG. 7 shows a random addressing circuit RAC and a respective scan unit in a respective scan unit group. Referring to FIG. 7, in some embodiments, the respective scan unit in the respective scan unit group includes a first processing sub-circuit PSC1, a second processing sub-circuit PSC2, a third processing sub-circuit PSC3, a fourth processing sub-circuit PSC4, a fifth processing sub-circuit PSC5, and an output sub-circuit OSC. Optionally, the respective scan unit further includes a sixth processing sub-circuit PSC6.

In some embodiments, the random addressing circuit RAC includes a decoder comprising k groups of transistors connected in parallel. First electrodes of the k groups of transistors are configured to receive a first voltage supply signal Vdd. The random addressing circuit RAC in some embodiments further includes a first transistor T1. Second electrodes of the k groups of transistors are connected to a first electrode of the first transistor T1. The k groups of transistors are configured to receive the 2k number of control signals, e.g., D0/$\underline{\text{D0}}$, D1/$\underline{\text{D1}}$, D2/$\underline{\text{D2}}$, . . . , Dk-2/$\underline{\text{Dk-2}}$, Dk-1/$\underline{\text{Dk-1}}$, k being a positive integer. A respective group of transistor(s) is configured to receive respective two control signals of the 2k number of control signals.

In some embodiments, the scan circuit includes a first node S, a second node Q, a third node K, and a fourth node S'.

In some embodiments, the random addressing circuit RAC further includes a thirteenth transistor T13 and a fourteenth transistor T14. A gate electrode of the thirteenth transistor T13 is configured to receive a first control signal A1, a first electrode of the thirteenth transistor T13 is connected to the second electrode of the first transistor T1, and a second electrode of the thirteenth transistor T13 is connected to the first node S. A gate electrode of the fourteenth transistor T14 is configured to receive a second control signal A2, a first electrode of the fourteenth transistor T14 is connected to the second electrode of the first transistor T1, and a second electrode of the fourteenth transistor T14 is connected to the fourth node S'. In some embodiments, when the gate electrode of the thirteenth transistor T13 is configured to receive an effective voltage of the first control signal A1, the gate electrode of the fourteenth transistor T14 is configured to receive an ineffective voltage of the second control signal A2. In some embodiments, when the gate electrode of the thirteenth transistor T13 is configured to receive an ineffective voltage of the first control signal A1, the gate electrode of the fourteenth transistor T14 is configured to receive an effective voltage of the second control signal A2.

In some embodiments, a gate electrode of the first transistor T1 is configured to receive the y-th clock signal Cy, a first electrode of the first transistor T1 is connected to second electrodes of the k groups of transistors in the decoder, a second electrode of the first transistor T1 is coupled to the first node S or the fourth node S', e.g., through the thirteenth transistor T13 or the fourteenth transistor T14.

In some embodiments, the fourth processing sub-circuit PSC4 includes a second transistor T2 and a fifteenth transistor T15. A gate electrode of the second transistor T2 is configured to receive the x-th clock signal Cx, a first electrode of the second transistor T2 is configured to receive a second voltage supply signal Vss, and a second electrode of the second transistor T2 is connected to the first node S and connected to the second electrode of the thirteen transistor T13. A gate electrode of the fifteenth transistor T15 is configured to receive the x-th clock signal Cx, a first electrode of the fifteenth transistor T15 is configured to receive a second voltage supply signal Vss, and a second electrode of the fifteenth transistor T15 is connected to the fourth node S' and connected to the second electrode of the fourteenth transistor T14.

In some embodiments, the fifth processing sub-circuit PSC5 includes a third transistor T3 and a sixteenth transistor T16. A gate electrode of the third transistor T3 is connected to the second node Q, a first electrode of the third transistor T3 is configured to receive the second voltage supply signal Vss, and a second electrode of the third transistor T3 is connected to the first node S. A gate electrode of the sixteenth transistor T16 is connected to the second node Q, a first electrode of the sixteenth transistor T16 is configured to receive the second voltage supply signal Vss, and a second electrode of the sixteenth transistor T16 is connected to the fourth node S' and connected to the second electrode of the fifteenth transistor T15.

In some embodiments, the second processing sub-circuit PSC2 includes a fourth transistor T4, a fifth transistor T5, a sixth transistor T6, and a seventeenth transistor T17. A gate electrode and a first electrode of the fourth transistor T4 are configured to receive the x-th clock signal Cx, a second electrode of the fourth transistor T4 is connected to the third node K. A gate electrode of the fifth transistor T5 is connected to the first node S, a first electrode of the fifth transistor T5 is configured to receive the second voltage supply signal Vss, and a second electrode of the fifth transistor T5 is connected to the third node K. A gate electrode of the sixth transistor T6 is configured to receive the z-th clock signal Cz, a first electrode of the sixth transistor T6 is configured to receive the second voltage supply signal Vss, and a second electrode of the sixth transistor T6 is connected to the third node K. A gate electrode of the seventeenth transistor T17 is connected to the fourth node S', a first electrode of the seventeenth transistor T17 is configured to receive the second voltage supply signal Vss, and a second electrode of the seventeenth transistor T17 is connected to the third node K.

In some embodiments, the first processing sub-circuit PSC1 includes a seventh transistor T7 and an eighth transistor T8. A gate electrode and a first electrode of the seventh transistor T7 are configured to receive the y-th clock signal Cy, a second electrode of the seventh transistor T7 is connected to a first electrode of the eighth transistor T8. A gate electrode of the eighth transistor T8 is connected to the third node K, a first electrode of the eighth transistor T8 is connected to the second electrode of the seventh transistor T7, and a second electrode of the eighth transistor T8 is connected to the second node Q.

In some embodiments, the third processing sub-circuit PSC3 includes a ninth transistor T9, an eleventh transistor T11, an eighteenth transistor T18, and a nineteenth transistor T19. A gate electrode of the ninth transistor T9 is connected to the first node S, a first electrode of the ninth transistor T9 is configured to receive the second voltage supply signal Vss, and a second electrode of the ninth transistor T9 is connected to the second node Q. A gate electrode of the eighteenth transistor T18 is connected to the fourth node S', a first electrode of the eighteenth transistor T18 is configured to receive the second voltage supply signal Vss, and a second electrode of the eighteenth transistor T18 is connected to the second node Q. A gate electrode of the eleventh transistor T11 is connected to the first node S, a first electrode of the eleventh transistor T11 is configured to receive the second voltage supply signal Vss, and a second electrode of the eleventh transistor T11 is connected to an output terminal. A gate electrode of the nineteenth transistor T19 is connected to the fourth node S', a first electrode of the nineteenth transistor T19 is configured to receive the second voltage supply signal Vss, and a second electrode of the nineteenth transistor T19 is connected to an output terminal.

In some embodiments, the sixth processing sub-circuit PSC6 includes a twelfth transistor T12. A gate electrode of the twelfth transistor T12 is connected to the third node K, a first electrode of the twelfth transistor T12 is configured to receive the second voltage supply signal Vss, and a second electrode of the twelfth transistor T12 is connected to the output terminal.

In some embodiments, the output sub-circuit OSC includes a tenth transistor T10 and a third capacitor C3. A gate electrode of the tenth transistor T10 is connected to the second node Q, a first electrode of the tenth transistor T10 is configured to receive the z-th clock signal Cz, a second electrode of the tenth transistor T10 is connected to the output terminal. A first capacitor electrode of the third capacitor C3 is connected to the second node Q, a second capacitor electrode of the third capacitor C3 is connected to the output terminal.

The inventors of the present disclosure discover that by having the first node S and the fourth node S', the transistors in the second processing sub-circuit PSC2, the first processing sub-circuit PSC1, and the third processing sub-circuit PSC3 are less prone to stress defects. In particular, the transistors in the second processing sub-circuit PSC2, the first processing sub-circuit PSC1, and the third processing sub-circuit PSC3 can be grouped into two groups. The first group of transistors includes the fifth transistor T5, the ninth transistor T9, and the eleventh transistor T11, gate electrodes of which are connected to the first node S. The second group of transistors includes the seventeenth transistor T17, the eighteenth transistor T18, and the nineteenth transistor T19, gate electrodes of which are connected to the fourth node S'. In one example, the first group of transistors and the second group of transistors are operated in a time-division mode. The transistors in each group are subject to the high voltage level for a reduced period of time. The inventors of the present disclosure discover that the stability of the scan circuit can be significantly increased.

Figure 8:
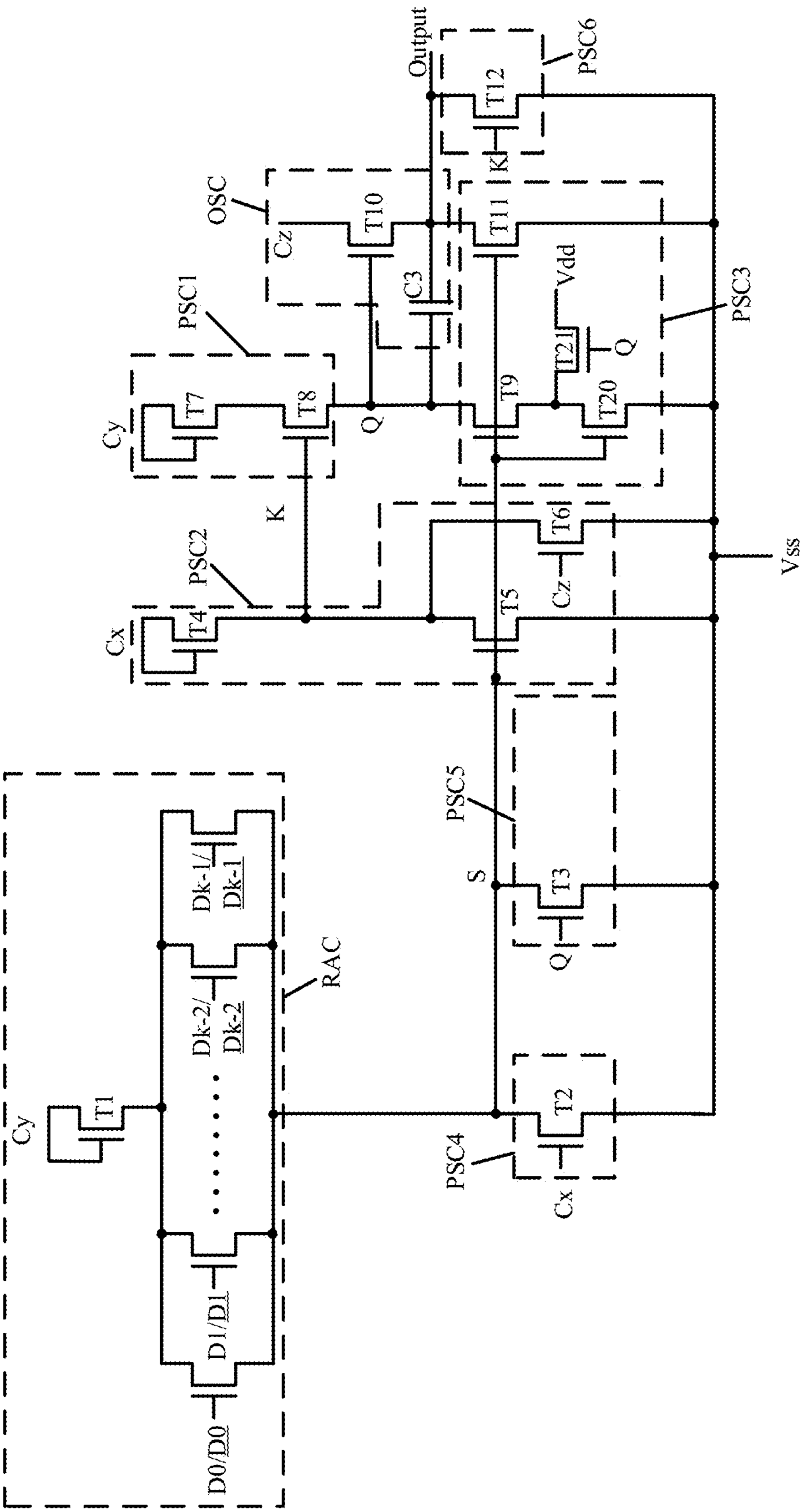
FIG. 8 is a circuit diagram of a scan circuit in some embodiments according to the present disclosure.

FIG. 8 is a circuit diagram of a scan circuit in some embodiments according to the present disclosure. FIG. 8 shows a scan circuit that effectively prevents leakage at the second node Q. FIG. 8 shows a random addressing circuit RAC and a respective scan unit in a respective scan unit group. Referring to FIG. 8, in some embodiments, the respective scan unit in the respective scan unit group includes a first processing sub-circuit PSC1, a second processing sub-circuit PSC2, a third processing sub-circuit PSC3, a fourth processing sub-circuit PSC4, a fifth processing sub-circuit PSC5, and an output sub-circuit OSC. Optionally, the respective scan unit further includes a sixth processing sub-circuit PSC6.

In some embodiments, the scan circuit includes a first node S, a second node Q, a third node K, and a fourth node S'.

In some embodiments, the random addressing circuit RAC includes a decoder comprising k groups of transistors connected in parallel. The random addressing circuit RAC in some embodiments further includes a first transistor T1. As shown in FIG. 8, a gate electrode and a first electrode of the first transistor T1 are configured to receive the y-th clock signal Cy, a second electrode of the first transistor T1 is connected to first electrodes of the k groups of transistors in the decoder. The first electrodes of the k groups of transistors are connected to the second electrode of the first transistor T1. Second electrodes of the k groups of transistors are connected to the first node S. The k groups of transistors are configured to receive the 2k number of control signals, e.g., D0/$\underline{D0}$, D1/$\underline{D1}$, D2/$\underline{D2}$, . . . , Dk-2/$\underline{Dk\text{-}2}$, Dk-1/$\underline{Dk\text{-}1}$, k being a positive integer. A respective group of transistor(s) is configured to receive respective two control signals of the 2k number of control signals.

In some embodiments, the fourth processing sub-circuit PSC4 includes a second transistor T2. A gate electrode of the second transistor T2 is configured to receive the x-th clock signal Cx, a first electrode of the second transistor T2 is configured to receive a second voltage supply signal Vss, and a second electrode of the second transistor T2 is connected to the first node S and connected to the random addressing circuit RAC.

In some embodiments, the fifth processing sub-circuit PSC5 includes a third transistor T3. A gate electrode of the third transistor T3 is connected to the second node Q, a first electrode of the third transistor T3 is configured to receive the second voltage supply signal Vss, and a second electrode of the third transistor T3 is connected to the first node S.

In some embodiments, the second processing sub-circuit PSC2 includes a fourth transistor T4, a fifth transistor T5, and a sixth transistor T6. A gate electrode and a first electrode of the fourth transistor T4 are configured to receive the x-th clock signal Cx, a second electrode of the fourth transistor T4 is connected to the third node K. A gate electrode of the fifth transistor T5 is connected to the first node S, a first electrode of the fifth transistor T5 is configured to receive the second voltage supply signal Vss, and a second electrode of the fifth transistor T5 is connected to the third node K. A gate electrode of the sixth transistor T6 is configured to receive the z-th clock signal Cz, a first electrode of the sixth transistor T6 is configured to receive the second voltage supply signal Vss, and a second electrode of the sixth transistor T6 is connected to the third node K.

In some embodiments, the first processing sub-circuit PSC1 includes a seventh transistor T7 and an eighth transistor T8. A gate electrode and a first electrode of the seventh transistor T7 are configured to receive the y-th clock signal Cy, a second electrode of the seventh transistor T7 is connected to a first electrode of the eighth transistor T8. A gate electrode of the eighth transistor T8 is connected to the third node K, a first electrode of the eighth transistor T8 is connected to the second electrode of the seventh transistor T7, and a second electrode of the eighth transistor T8 is connected to the second node Q.

In some embodiments, the third processing sub-circuit PSC3 includes a ninth transistor T9, an eleventh transistor T11, a twentieth transistor T20, and a twenty first transistor T21. A gate electrode of the ninth transistor T9 is connected to the first node S, a first electrode of the ninth transistor T9 is connected to second electrodes of the twentieth transistor T20 and the twenty first transistor T21, and a second electrode of the ninth transistor T9 is connected to the second node Q. A gate electrode of the eleventh transistor T11 is connected to the first node S, a first electrode of the eleventh transistor T11 is configured to receive the second voltage supply signal Vss, and a second electrode of the eleventh transistor T11 is connected to an output terminal. A gate electrode of the twentieth transistor T20 is connected to the first node S, a first electrode of the twentieth transistor T20 is configured to receive the second voltage supply signal Vss, a second electrode of the twentieth transistor T20 is connected to the first electrode of the ninth transistor T9 and a second electrode of the twenty first transistor T21. A gate electrode of the twenty first transistor T21 is connected to the second node Q, a first electrode of the twenty first transistor T21 is configured to receive a first voltage supply signal Vdd, a second electrode of the twenty first transistor T21 is connected to the second electrode of the twentieth transistor T20 and the first electrode of the ninth transistor T9. By having the twentieth transistor T20 and the twenty first transistor T21, leakage at the second node Q can be effectively reduced or prevented.

In some embodiments, the sixth processing sub-circuit PSC6 includes a twelfth transistor T12. A gate electrode of the twelfth transistor T12 is connected to the third node K, a first electrode of the twelfth transistor T12 is configured to receive the second voltage supply signal Vss, and a second electrode of the twelfth transistor T12 is connected to the output terminal.

In some embodiments, the output sub-circuit OSC includes a tenth transistor T10 and a third capacitor C3. A gate electrode of the tenth transistor T10 is connected to the second node Q, a first electrode of the tenth transistor T10 is configured to receive the z-th clock signal Cz, a second electrode of the tenth transistor T10 is connected to the output terminal. A first capacitor electrode of the third capacitor C3 is connected to the second node Q, a second capacitor electrode of the third capacitor C3 is connected to the output terminal.

Figure 9:
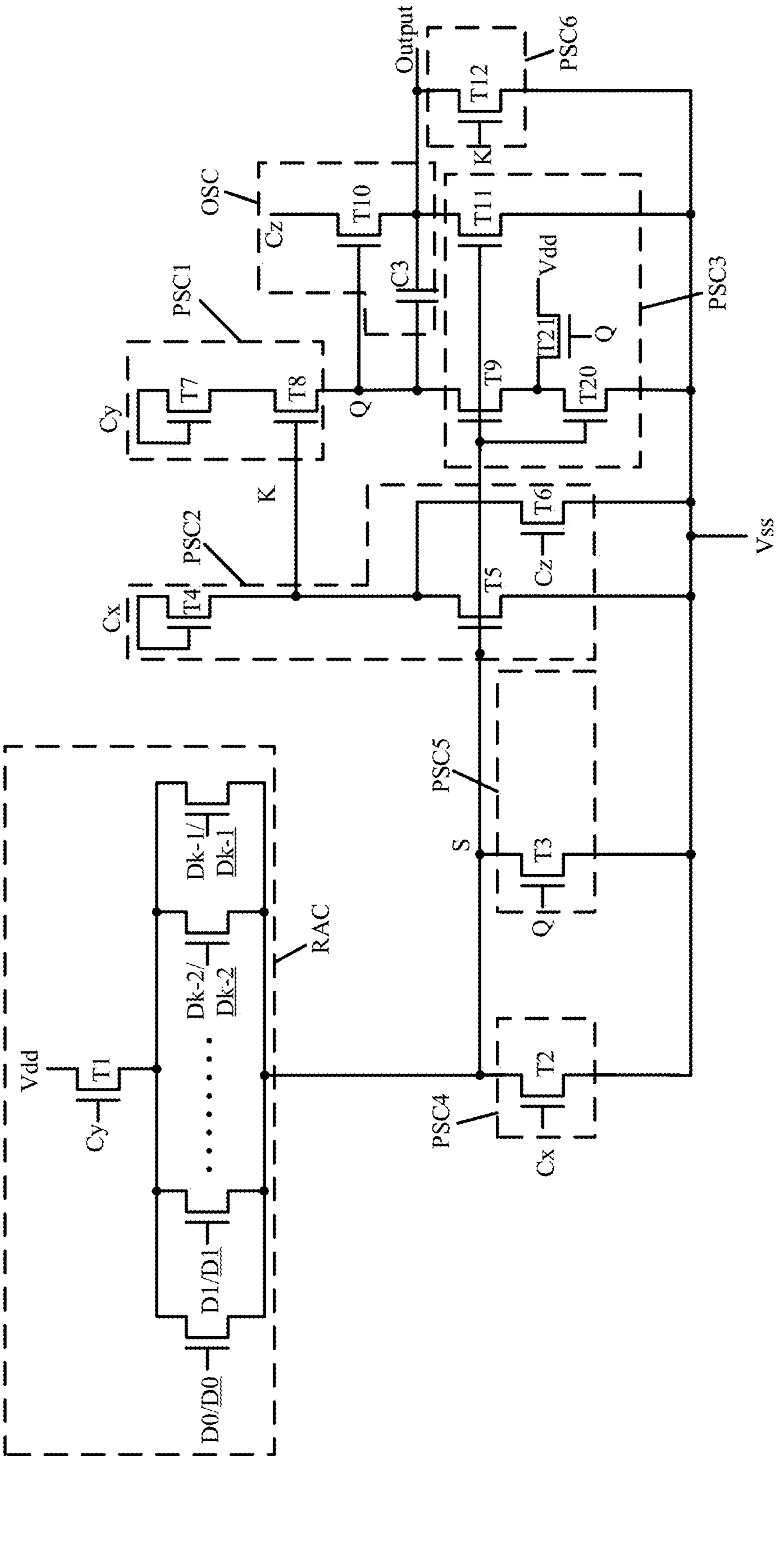
FIG. 9 is a circuit diagram of a scan circuit in some embodiments according to the present disclosure.

FIG. 9 is a circuit diagram of a scan circuit in some embodiments according to the present disclosure. The scan circuit depicted in FIG. 9 differs from the scan circuit depicted in FIG. 8 in the structure of the random addressing circuit RAC. Specifically, a gate electrode of the first transistor T1 is configured to receive the y-th clock signal Cy, a first electrode of the first transistor T1 is configured to receive a first voltage supply signal Vdd, and a second electrode of the first transistor T1 is connected to first electrodes of the k groups of transistors in the decoder. The first electrodes of the k groups of transistors are connected to the second electrode of the first transistor T1. Second electrodes of the k groups of transistors are connected to the first node S. The k groups of transistors are configured to receive the 2k number of control signals, e.g., D0/$\underline{D0}$, D1/$\underline{D1}$, D2/$\underline{D2}$, . . . , Dk-2/$\underline{Dk\text{-}2}$, Dk-1/$\underline{Dk\text{-}1}$, k being a positive integer. A respective group of transistor(s) is configured to receive respective two control signals of the 2k number of control signals.

Figure 10:
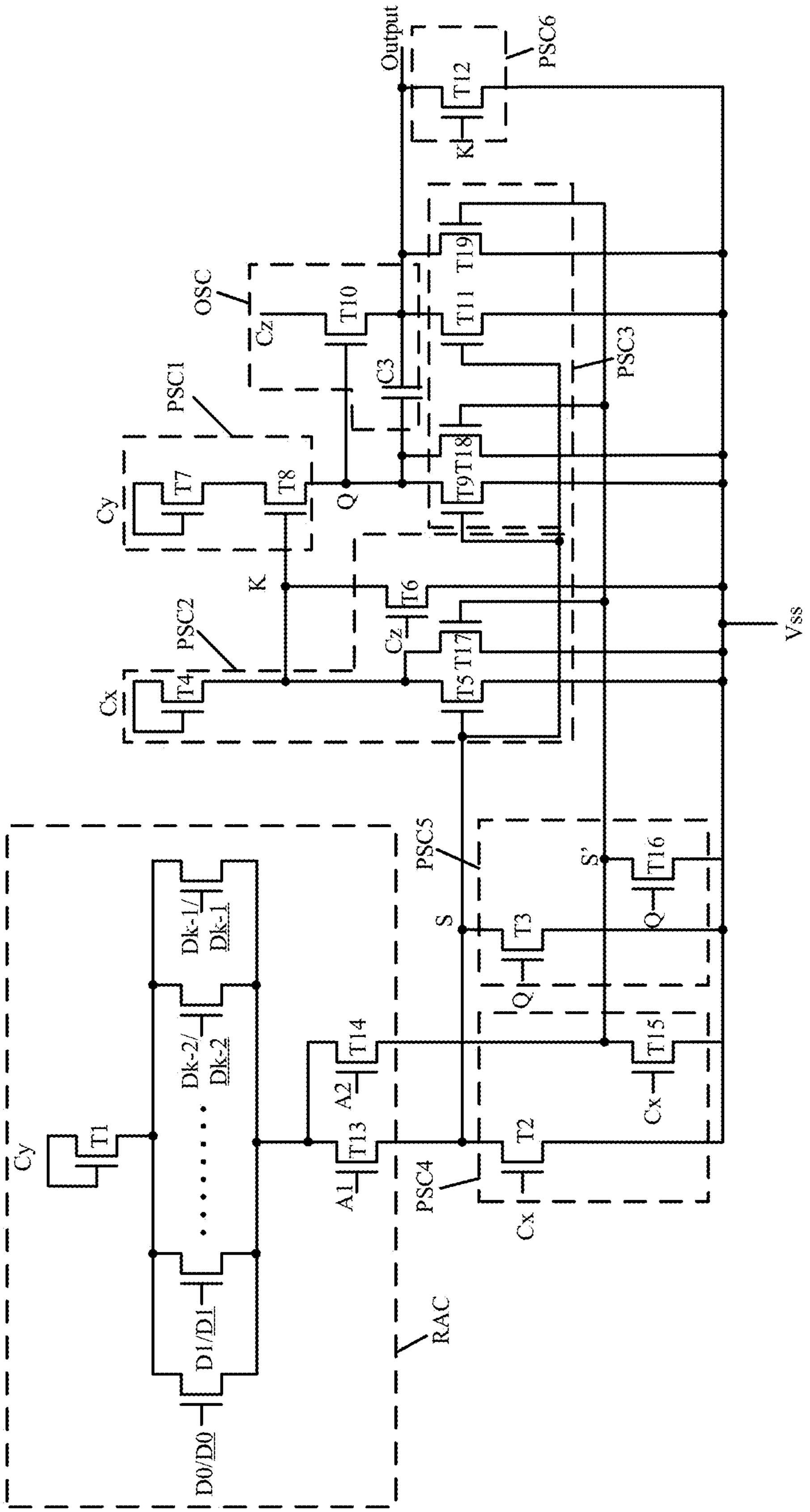
FIG. 10 is a circuit diagram of a scan circuit in some embodiments according to the present disclosure.

FIG. 10 is a circuit diagram of a scan circuit in some embodiments according to the present disclosure. The scan circuit depicted in FIG. 10 differs from the scan circuit depicted in FIG. 7 in the structure of the random addressing circuit RAC. Specifically, the random addressing circuit RAC in some embodiments includes a decoder comprising k groups of transistors connected in parallel. The random addressing circuit RAC in some embodiments further includes a first transistor T1. As shown in FIG. 10, a gate electrode and a first electrode of the first transistor T1 are configured to receive the y-th clock signal Cy, a second electrode of the first transistor T1 is connected to first electrodes of the k groups of transistors in the decoder. The first electrodes of the k groups of transistors are connected to the second electrode of the first transistor T1. Second electrodes of the k groups of transistors are coupled to the first node S or the fourth node S', e.g., through the thirteenth transistor T13 or the fourteenth transistor T14. In one example, the second electrodes of the k groups of transistors are connected to first electrodes of the thirteenth transistor T13 and the fourteenth transistor T14. The k groups of transistors are configured to receive the 2k number of control signals, e.g., D0/$\underline{D0}$, D1/$\underline{D1}$, D2/$\underline{D2}$, . . . , Dk-2/$\underline{Dk\text{-}2}$, Dk-1/$\underline{Dk\text{-}1}$, k being a positive integer. A respective group of transistor(s) is configured to receive respective two control signals of the 2k number of control signals.

Figure 11:
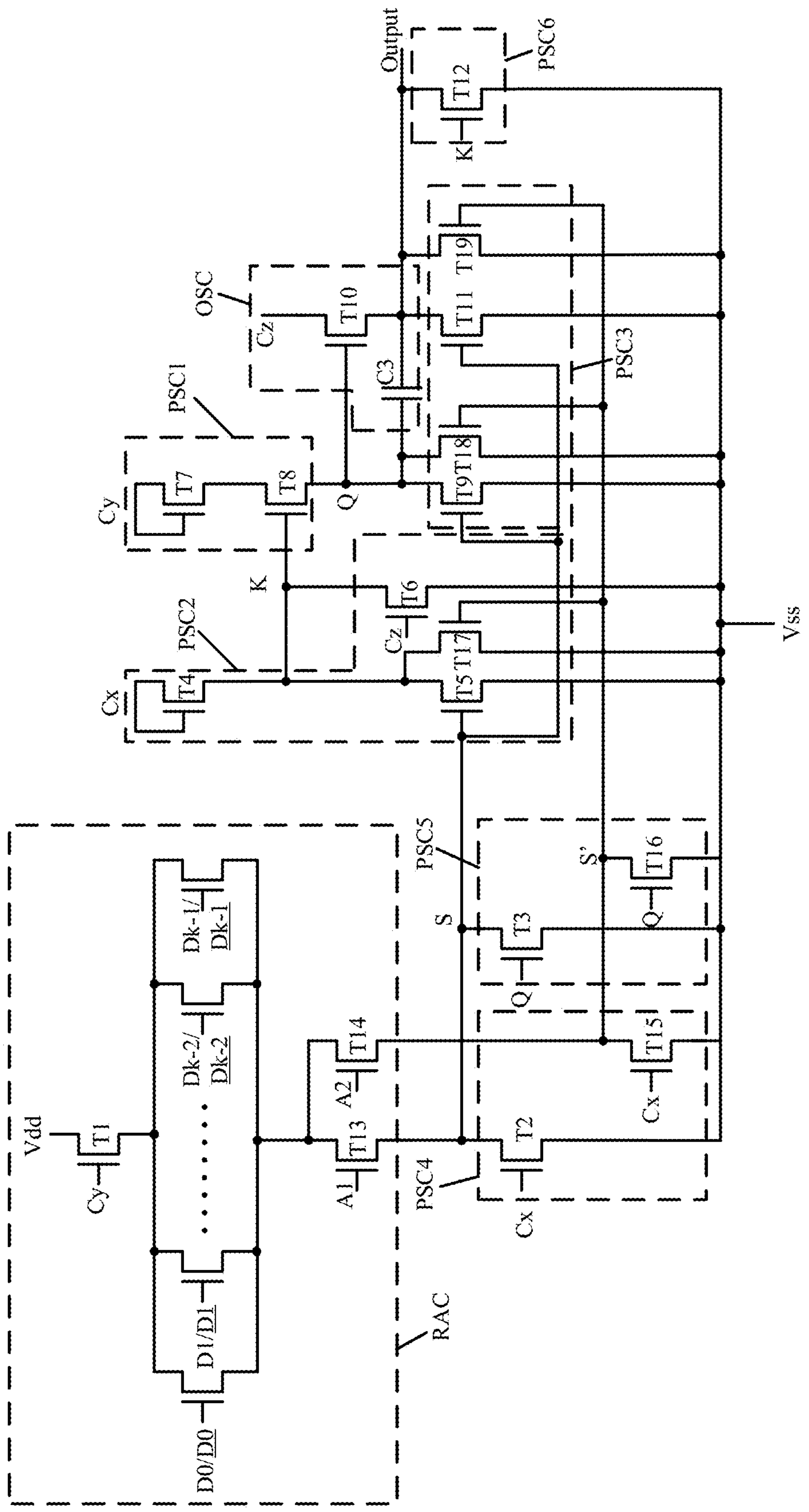
FIG. 11 is a circuit diagram of a scan circuit in some embodiments according to the present disclosure.

FIG. 11 is a circuit diagram of a scan circuit in some embodiments according to the present disclosure. The scan circuit depicted in FIG. 11 differs from the scan circuit depicted in FIG. 10 in the structure of the random addressing circuit RAC. Specifically, in the scan circuit depicted in FIG. 11, a gate electrode of the first transistor T1 is configured to receive the y-th clock signal Cy, a first electrode of the first transistor T1 is configured to receive a first voltage supply signal Vdd, and a second electrode of the first transistor T1 is connected to first electrodes of the k groups of transistors in the decoder. The first electrodes of the k groups of transistors are connected to the second electrode of the first transistor T1. Second electrodes of the k groups of transistors are coupled to the first node S or the fourth node S', e.g., through the thirteenth transistor T13 or the fourteenth transistor T14. In one example, the second electrodes of the k groups of transistors are connected to first electrodes of the thirteenth transistor T13 and the fourteenth transistor T14. The k groups of transistors are configured to receive the 2k number of control signals, e.g., D0/$\underline{\text{D0}}$, D1/$\underline{\text{D1}}$, D2/$\underline{\text{D2}}$, . . . , Dk-2/$\underline{\text{Dk-2}}$, Dk-1/$\underline{\text{Dk-1}}$, k being a positive integer. A respective group of transistor(s) is configured to receive respective two control signals of the 2k number of control signals.

Figure 12:
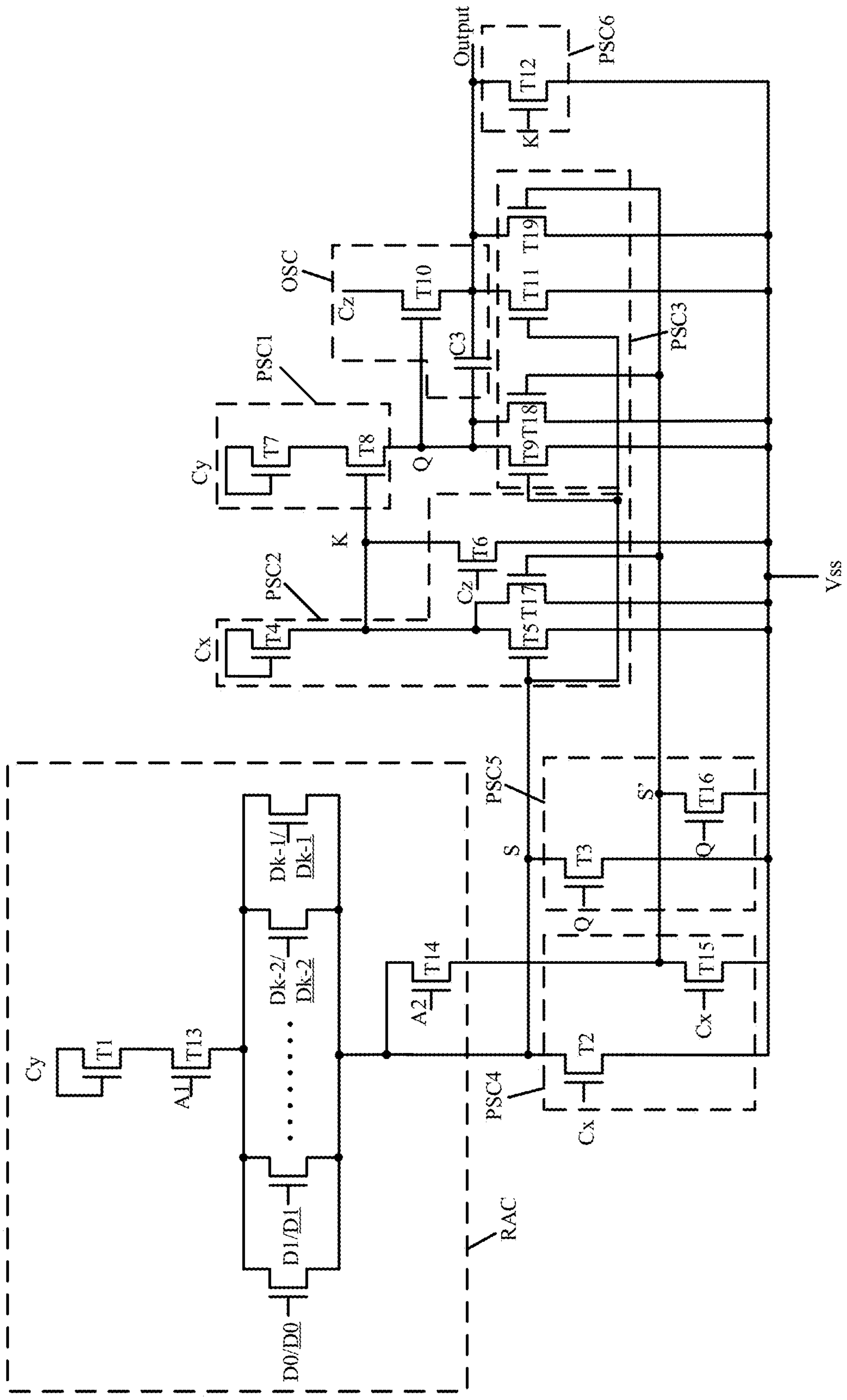
FIG. 12 is a circuit diagram of a scan circuit in some embodiments according to the present disclosure.

FIG. 12 is a circuit diagram of a scan circuit in some embodiments according to the present disclosure. The scan circuit depicted in FIG. 12 differs from the scan circuit depicted in FIG. 10 in the structure of the random addressing circuit RAC. Specifically, in the scan circuit depicted in FIG. 12, a gate electrode and a first electrode of the first transistor T1 are configured to receive the y-th clock signal Cy, a second electrode of the first transistor T1 is connected to a first electrode of the thirteenth transistor T13. A gate electrode of the thirteenth transistor T13 is configured to receive a first control signal A1, a first electrode of the thirteenth transistor T13 is connected to the second electrode of the first transistor T1, a second electrode of the thirteenth transistor T13 is connected to first electrodes of the k groups of transistors in the decoder. The first electrodes of the k groups of transistors are connected to the second electrode of the thirteenth transistor T13. Second electrodes of the k groups of transistors are connected to the first node S or coupled to the fourth node S', e.g., through the fourteenth transistor T14. In one example, the second electrodes of the k groups of transistors are connected to the first node S, and connected to a first electrode of the fourteenth transistor T14. The k groups of transistors are configured to receive the 2*k* number of control signals, e.g., D0/$\underline{\text{D0}}$, D1/$\underline{\text{D1}}$, D2/$\underline{\text{D2}}$, . . . , Dk-2/$\underline{\text{Dk-2}}$, Dk-1/$\underline{\text{Dk-1}}$, k being a positive integer. A respective group of transistor(s) is configured to receive respective two control signals of the 2k number of control signals.

Figure 13:
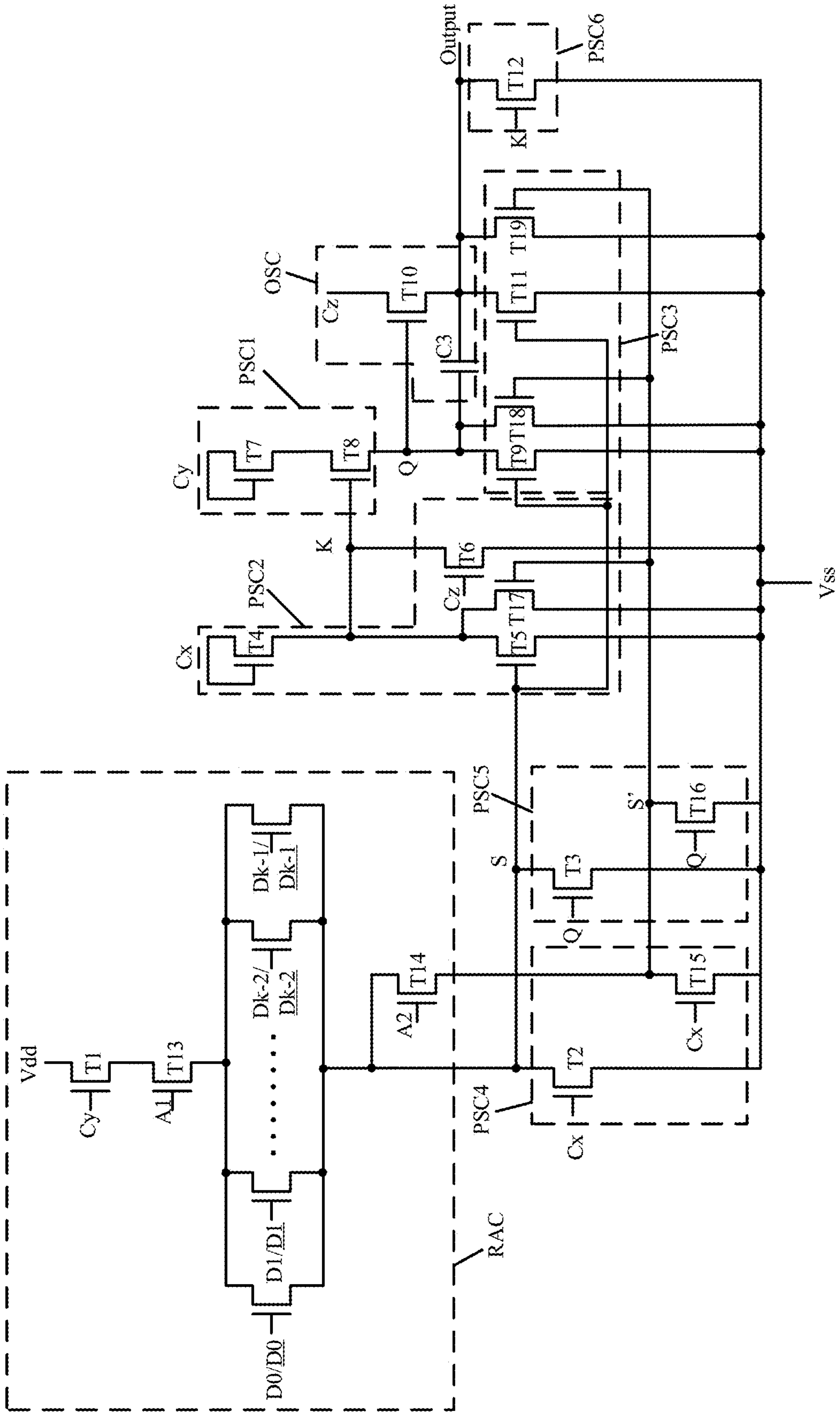
FIG. 13 is a circuit diagram of a scan circuit in some embodiments according to the present disclosure.

FIG. 13 is a circuit diagram of a scan circuit in some embodiments according to the present disclosure. The scan circuit depicted in FIG. 13 differs from the scan circuit depicted in FIG. 12 in the structure of the random addressing circuit RAC. Specifically, in the scan circuit depicted in FIG. 13, a gate electrode of the first transistor T1 is configured to receive the y-th clock signal Cy, a first electrode of the first transistor T1 is configured to receive a first voltage supply signal Vdd, and a second electrode of the first transistor T1 is connected to a first electrode of the thirteenth transistor T13.

In another aspect, the present invention provides a display apparatus, including the scan circuit described herein or fabricated by a method described herein, and a display panel having a plurality of light emitting elements. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus. Optionally, the display apparatus is a quantum dots display apparatus.

The scan circuit described in the present disclosure may be used for generating various appropriate control signals to subpixels in a display panel. In one example, the scan circuit described in the present disclosure is a light emitting control signal generating circuit configured to generate light emitting control signals for subpixels in a display panel. In another example, the scan circuit described in the present disclosure is a gate scanning signal generating circuit configured to generate gate scanning signals for subpixels in a display panel. In another example, the scan circuit described in the present disclosure is a reset control signal generating circuit configured to generate reset control signals for subpixels in a display panel.

In another aspect, the present invention provides a method of operating a scan circuit. In some embodiments, the method includes providing n number of clock signals to a respective scan unit group of a plurality of scan unit groups of the scan circuit; and providing 2k number of control signals to k groups of transistors in a decoder of a random addressing circuit of the scan circuit, a respective group of transistor(s) of the k groups of transistors being configured to receive respective two control signals of the 2k number of control signals. Optionally, providing the n number of clock signals to the respective scan unit group includes providing n' number of clock signals to a respective scan unit of the m number of scan units in the respective scan unit group, n'<n, n' and n being positive integers; and providing different combinations of clock signals to at least two scan units of the m number of scan units in the respective scan unit group.

In some embodiments, the method includes providing n' number of clock signals to a respective scan unit in the respective scan unit group, n'<n, n' and n being positive integers. At least two scan units of the m number of scan units in the respective scan unit group RSG are provided with different combinations of clock signals. Optionally, at least two adjacent scan units of the m number of scan units in the respective scan unit group are provided with different combinations of clock signals. Optionally, the method includes providing different combinations of clock signals to the m number of scan units in the respective scan unit group. To illustrate, in one example, m=4, n=4, and n'=3. The $1^{st}$ scan unit is provided with CLK1, CLK2, and CLK4, the $2^{nd}$ scan unit is provided with CLK2, CLK3, and CLK1, the $3^{rd}$ scan unit is provided with CLK3, CLK4, and CLK2, and the 4-th scan unit is provided with CLK4, CLK1, and CLK3.

In some embodiments, the method includes providing a first combination of clock signals to a first scan unit of the m number of scan units in the respective scan unit group, and providing a second combination of clock signals to a second scan unit of the m number of scan units in the respective scan unit group. Optionally, the first scan unit and the second scan unit are two adjacent scan units in the respective scan unit group. In some embodiments, the first combination of clock signals includes n' number of clock signals, and the second combination of clock signals includes n' number of clock signals. Optionally, the first combination of clock signals includes at least one clock signal that is not in the second combination of clock signals. Optionally, the second combination of clock signals includes at least one clock signal that is not in the first combination of clock signals. Optionally, n'' number of clock signals out of the n' number of clock signals in the first combination of clock signals are the same clock signals as n" number of clock signals out of the n' number of clock signals in the second combination of clock signals, wherein n"<n', and n" is a positive integer. In one example, n"=(n'−1). To illustrate, in one example, m=4, n=4, n'=3, and n"=2. The $1^{st}$ scan unit is provided with CLK1, CLK3, and CLK4, the $2^{nd}$ scan unit is provided with CLK2, CLK4, and CLK1, the $3^{rd}$ scan unit is provided with CLK3, CLK1, and CLK2, and the 4-th scan unit is provided with CLK4, CLK2, and CLK3.

In some embodiments, the n number of clock signals are sequentially shifted by one pulse. Optionally, the method further comprises providing an x-th clock signal, a y-th clock signal, and a z-th clock signal to the respective scan unit; Optionally, the x-th clock signal, the y-th clock signal, and the z-th clock signal are three different clock signals selected from the n number of clock signals. Optionally, the z-th clock signal is shifted by one pulse relative to the y-th clock signal. Optionally, the y-th clock signal is shifted by two pulses relative to the x-th clock signal.

In some embodiments, the respective scan unit includes a first processing sub-circuit, a second processing sub-circuit, a third processing sub-circuit, a fourth processing sub-circuit, a fifth processing sub-circuit, and an output sub-circuit. In some embodiments, the method includes providing a y-th clock signal to the first processing sub-circuit connected to a second node and connected to a third node; providing an x-th clock signal and a second voltage supply signal to the second processing sub-circuit connected to the first node and the third node; providing the second voltage supply signal to the third processing sub-circuit connected to the first node and the second node; providing the x-th clock signal and the second voltage supply signal to the fourth processing sub-circuit connected to the first node; providing the second voltage supply signal to the fifth processing sub-circuit connected to the first node and the second node; and providing a z-th clock signal to the output sub-circuit connected to the second node and the output terminal.

In some embodiments, the respective scan unit further includes a sixth processing sub-circuit, and the method further includes providing the second voltage supply signal to the sixth processing sub-circuit connected to the third node and an output terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A scan circuit, comprises a addressing circuit and a plurality of scan units, the addressing circuit being connected to the plurality of scan units;

wherein the addressing circuit is configured to receive 2k number of control signals having 2k number of different combinations, k being a positive integer, k>1; and at least one of the 2k number of different combinations is an effective signal activating at least one corresponding scan unit in a scan unit group for outputting signals;

wherein the plurality of scan units comprises a plurality of scan unit groups;

a respective scan unit group of the plurality of scan unit groups comprises m number of scan units, and is configured to receive n number of clock signals, m being a positive integer, m>1;

a respective scan unit of the m number of scan units in the respective scan unit group is configured to receive n' number of clock signals, n'<n, n' and n being positive integers, n>1, n'≥1; and at least two scan units of the m number of scan units in the respective scan unit group are configured to receive different combinations of clock signals;

wherein the addressing circuit comprises a decoder configured to receive the 2k number of control signals; and the decoder comprises k groups of transistors, a respective group of the k groups of transistors being configured to receive respective two control signals of the 2k number of control signals.

2. The scan circuit of claim 1, wherein the 2k number of control signals have $2^k$ number of different combinations;

the respective scan unit group is selected by the addressing circuit based on at least one of the $2^k$ number of different combinations; and upon being selected by the addressing circuit, the m number of scan units in the respective scan unit group are configured to output signals based on the different combinations of clock signals received, respectively.

3. The scan circuit of claim 1, wherein the n number of clock signals are sequentially shifted by one pulse;

the respective scan unit is configured to receive an x-th clock signal, a y-th clock signal, and a z-th clock signal, x, y, z being positive integers;

the x-th clock signal, the y-th clock signal, and the z-th clock signal are three different clock signals selected from the n number of clock signals;

the z-th clock signal is shifted by one pulse relative to the y-th clock signal; and the y-th clock signal is shifted by two pulses relative to the x-th clock signal.

4. The scan circuit of claim 1, wherein the addressing circuit further comprises a first transistor;

a gate electrode of the first transistor is configured to receive a y-th clock signal;

a first electrode of the first transistor is connected to second electrodes of k groups of transistors in a decoder; and a second electrode of the first transistor is connected to a first node.

5. The scan circuit of claim 1, wherein the addressing circuit further comprises a first transistor, a thirteenth transistor, and a fourteenth transistor;

a gate electrode of the first transistor is configured to receive a y-th clock signal, a first electrode of the first transistor is connected to second electrodes of k groups of transistors in a decoder, a second electrode of the first transistor is connected to first electrodes of the thirteenth transistor and the fourteenth transistor;

a gate electrode of the thirteenth transistor is configured to receive a first control signal, the first electrode of the thirteenth transistor is connected to the second electrode of the first transistor, and a second electrode of the thirteenth transistor is connected to a first node; and a gate electrode of the fourteenth transistor is configured to receive a second control signal, the first electrode of the fourteenth transistor is connected to the second electrode of the first transistor, and a second electrode of the fourteenth transistor is connected to a fourth node.

6. The scan circuit of claim 1, wherein the addressing circuit further comprises a first transistor;

a gate electrode of the first transistor are configured to receive a y-th clock signal;

a first electrode of the first transistor is configured to receive a first voltage supply signal or the y-th clock signal; and a second electrode of the first transistor is connected to first electrodes of k groups of transistors in a decoder.

7. The scan circuit of claim 1, wherein the addressing circuit further comprises a first transistor, a thirteenth transistor, and a fourteenth transistor;

a gate electrode of the first transistor is configured to receive a y-th clock signal, a first electrode of the first transistor is configured to receive a first voltage supply signal or the y-th clock signal, a second electrode of the first transistor is connected to first electrodes of k groups of transistors in a decoder;

a gate electrode of the thirteenth transistor is configured to receive a first control signal, a first electrode of the thirteenth transistor is connected to second electrodes of the k groups of transistors, and a second electrode of the thirteenth transistor is connected to a first node; and a gate electrode of the fourteenth transistor is configured to receive a second control signal, a first electrode of the fourteenth transistor is connected to the second electrodes of the k groups of transistors, and a second electrode of the fourteenth transistor is connected to a fourth node.

8. The scan circuit of claim 1, wherein the addressing circuit further comprises a first transistor, a thirteenth transistor, and a fourteenth transistor;

a gate electrode of the first transistor is configured to receive a y-th clock signal, a first electrode of the first transistor is configured to receive a first voltage supply signal or the y-th clock signal, a second electrode of the first transistor is connected to a first electrode of the thirteenth transistor;

a gate electrode of the thirteenth transistor is configured to receive a first control signal, the first electrode of the thirteenth transistor is connected to the second electrode of the first transistor, a second electrode of the thirteenth transistor is connected to first electrodes of k groups of transistors in a decoder; and a gate electrode of the fourteenth transistor is configured to receive a second control signal, a first electrode of the fourteenth transistor is connected to second electrodes of the k groups of transistors, and a second electrode of the fourteenth transistor is connected to a fourth node.

9. A display apparatus, comprising the scan circuit of claim 1, and a display panel having a plurality of light emitting elements.

10. A scan circuit, comprises a addressing circuit and a plurality of scan units, the random addressing circuit being connected to the plurality of scan units;

wherein the addressing circuit is configured to receive 2k number of control signals having $2^k$ number of different combinations, k being a positive integer, k>1; and at least one of the $2^k$ number of different combinations is an effective signal activating at least one corresponding scan unit in a scan unit group for outputting signals;

wherein the plurality of scan units comprises a plurality of scan unit groups;

a respective scan unit group of the plurality of scan unit groups comprises m number of scan units, and is configured to receive n number of clock signals, m being a positive integer, m>1;

a respective scan unit of the m number of scan units in the respective scan unit group is configured to receive n' number of clock signals, n'<n, n' and n being positive integers, n>1, n'≥1; and at least two scan units of the m number of scan units in the respective scan unit group are configured to receive different combinations of clock signals;

wherein the respective scan unit comprises a first processing sub-circuit, a second processing sub-circuit, a third processing sub-circuit, a fourth processing sub-circuit, a fifth processing sub-circuit, and an output sub-circuit;

the addressing circuit is coupled to a first node;

the first processing sub-circuit is configured to receive a y-th clock signal, and is connected to a second node and connected to a third node;

the second processing sub-circuit is configured to receive an x-th clock signal and configured to receive a second voltage supply signal, and is connected to the first node and connected to the third node;

the third processing sub-circuit is configured to receive the second voltage supply signal, and is connected to the first node and connected to the second node;

the fourth processing sub-circuit is configured to receive the x-th clock signal and configured to receive the second voltage supply signal, and is connected to the first node;

the fifth processing sub-circuit is configured to receive the second voltage supply signal, and is connected to the first node and connected to the second node; and the output sub-circuit is configured to receive a z-th clock signal, configured to output an output signal, and is connected to the second node and connected to an output terminal.

11. The scan circuit of claim 10, wherein the first processing sub-circuit comprises a seventh transistor and an eighth transistor;

a gate electrode and a first electrode of the seventh transistor are configured to receive the y-th clock signal, a second electrode of the seventh transistor is connected to a first electrode of the eighth transistor; and a gate electrode of the eighth transistor is connected to the third node, the first electrode of the eighth transistor is connected to the second electrode of the seventh transistor, and a second electrode of the eighth transistor is connected to the second node.

12. The scan circuit of claim 5, wherein the second processing sub-circuit comprises a fourth transistor, a fifth transistor, a sixth transistor;

a gate electrode and a first electrode of the fourth transistor are configured to receive the x-th clock signal, a second electrode of the fourth transistor is connected to the third node;

a gate electrode of the fifth transistor is connected to the first node, a first electrode of the fifth transistor is configured to receive the second voltage supply signal, and a second electrode of the fifth transistor is connected to the third node; and a gate electrode of the sixth transistor is configured to receive the z-th clock signal, a first electrode of the sixth transistor is configured to receive the second voltage supply signal, and a second electrode of the sixth transistor is connected to the third node.

13. The scan circuit of claim 12, wherein the second processing sub-circuit further comprises a second capacitor;

a first capacitor electrode of the second capacitor is connected to the third node; and a second capacitor electrode of the second capacitor is configured to receive the second voltage supply signal;

wherein the second processing sub-circuit further comprises a seventeenth transistor;

a gate electrode of the seventeenth transistor is connected to a fourth node;

a first electrode of the seventeenth transistor is configured to receive the second voltage supply signal; and a second electrode of the seventeenth transistor is connected to the third node.

14. The scan circuit of claim 10, wherein the third processing sub-circuit comprises a ninth transistor and an eleventh transistor;

a gate electrode of the ninth transistor is connected to the first node, a first electrode of the ninth transistor is configured to receive the second voltage supply signal, and a second electrode of the ninth transistor is connected to the second node; and a gate electrode of the eleventh transistor is connected to the first node, a first electrode of the eleventh transistor is configured to receive the second voltage supply signal, and a second electrode of the eleventh transistor is connected to the output terminal;

wherein the third processing sub-circuit further comprises an eighteenth transistor and a nineteenth transistor;

a gate electrode of the eighteenth transistor is connected to a fourth node, a first electrode of the eighteenth transistor is configured to receive the second voltage supply signal, and a second electrode of the eighteenth transistor is connected to the second node; and a gate electrode of the nineteenth transistor is connected to the fourth node, a first electrode of the nineteenth transistor is configured to receive the second voltage supply signal, and a second electrode of the nineteenth transistor is connected to the output terminal.

15. The scan circuit of claim 10, wherein the fourth processing sub-circuit comprises a second transistor;

a gate electrode of the second transistor is configured to receive the x-th clock signal;

a first electrode of the second transistor is configured to receive the second voltage supply signal; and a second electrode of the second transistor is connected to the first node;

wherein the fourth processing sub-circuit further comprises a fifteenth transistor;

a gate electrode of the fifteenth transistor is configured to receive the x-th clock signal;

a first electrode of the fifteenth transistor is configured to receive the second voltage supply signal; and a second electrode of the fifteenth transistor is connected to a fourth node.

16. The scan circuit of claim 10, wherein the fifth processing sub-circuit comprises a third transistor;

a gate electrode of the third transistor is connected to the second node;

a first electrode of the third transistor is configured to receive the second voltage supply signal; and a second electrode of the third transistor is connected to the first node;

wherein the fifth processing sub-circuit further comprises a first capacitor;

a first capacitor electrode of the first capacitor is connected to the first node; and a second capacitor electrode of the first capacitor is configured to receive the second voltage supply signal;

wherein the fifth processing sub-circuit further comprises a sixteenth transistor;

a gate electrode of the sixteenth transistor is connected to the second node;

a first electrode of the sixteenth transistor is configured to receive the second voltage supply signal; and a second electrode of the sixteenth transistor is connected to a fourth node.

17. The scan circuit of claim 10, wherein the respective scan unit further comprises a sixth processing sub-circuit, which is configured to receive the second voltage supply signal, and is connected to the third node and connected to the output terminal of the scan circuit;

wherein the sixth processing sub-circuit comprises a twelfth transistor;

a gate electrode of the twelfth transistor is connected to the third node;

a first electrode of the twelfth transistor is configured to receive the second voltage supply signal; and a second electrode of the twelfth transistor is connected to the output terminal.

18. The scan circuit of claim 10, wherein the output sub-circuit includes a tenth transistor and a third capacitor;

a gate electrode of the tenth transistor is connected to the second node, a first electrode of the tenth transistor is configured to receive the z-th clock signal, a second electrode of the tenth transistor is connected to the output terminal; and a first capacitor electrode of the third capacitor is connected to the second node, a second capacitor electrode of the third capacitor is connected to the output terminal.

19. A method of operating a scan circuit, comprising:

providing n number of clock signals to a respective scan unit group of a plurality of scan unit groups of the scan circuit; and providing 2k number of control signals to k groups of transistors in a decoder of a addressing circuit of the scan circuit, a respective group of the k groups of transistors being configured to receive respective two control signals of the 2k number of control signals, k being a positive integer, k>1;

wherein providing the n number of clock signals to the respective scan unit group comprises:

providing n' number of clock signals to a respective scan unit of m number of scan units in the respective scan unit group, m being a positive integer, m>1, n'<n, n' and n being positive integers, n>1, n'≥1; and providing different combinations of clock signals to at least two scan units of the m number of scan units in the respective scan unit group;

wherein the decoder comprises k groups of transistors, a respective group of the k groups of transistors being configured to receive respective two control signals of the 2k number of control signals.

* * * * *